US012650172B2

(12) United States Patent
Koontz

(10) Patent No.: US 12,650,172 B2
(45) Date of Patent: Jun. 9, 2026

(54) LATERALLY MOVEABLE COMPRESSOR PISTON ROD LIP SEAL ASSEMBLY

(71) Applicant: ARIEL CORPORATION, Mt. Vernon, OH (US)

(72) Inventor: Evan William Koontz, Howard, OH (US)

(73) Assignee: ARIEL CORPORATION, Mt. Vernon, OH (US)

( * ) Notice: Subject to any disclaimer, the term of this patent is extended or adjusted under 35 U.S.C. 154(b) by 0 days.

(21) Appl. No.: 19/017,129

(22) Filed: Jan. 10, 2025

(65) Prior Publication Data

US 2025/0146575 A1 May 8, 2025

Related U.S. Application Data

(63) Continuation-in-part of application No. 18/141,880, filed on May 1, 2023, now abandoned.

(60) Provisional application No. 63/337,433, filed on May 2, 2022.

(51) Int. Cl.
| | |
|---|---|
| *F16J 15/3212* | (2016.01) |
| *F16J 15/3236* | (2016.01) |
| *F16J 15/56* | (2006.01) |

(52) U.S. Cl.
CPC ....... *F16J 15/3212* (2013.01); *F16J 15/3236* (2013.01); *F16J 15/56* (2013.01)

(58) Field of Classification Search
CPC .......... F16J 15/18; F16J 15/184; F16J 15/186; F16J 15/3212; F16J 15/3216; F16J 15/322; F16J 15/3236; F16J 15/324; F16J 15/3248; F16J 15/3252; F16J 15/3268; F16J 15/3284; F16J 15/56
See application file for complete search history.

(56) References Cited

U.S. PATENT DOCUMENTS

| | | | |
|---|---|---|---|
| 2,979,350 A | 4/1961 | Lansky | |
| 3,727,927 A * | 4/1973 | Packard | .................. B24B 19/11 |
| | | | 277/453 |
| 3,751,784 A * | 8/1973 | Packard | ..................... F16J 9/02 |
| | | | 277/435 |
| 3,826,508 A * | 7/1974 | Packard | ..................... F16J 9/20 |
| | | | 277/467 |
| 3,926,166 A * | 12/1975 | Packard | ..................... F02F 5/00 |
| | | | 277/459 |

(Continued)

FOREIGN PATENT DOCUMENTS

CN            115370745 A  *  11/2022  ............. F16J 15/062

*Primary Examiner* — Nicholas L Foster
(74) *Attorney, Agent, or Firm* — SQUIRE PATTON BOGGS (US) LLP

(57)            ABSTRACT
Some example embodiments may relate to laterally moveable compressor piston rod lip seals. For example, a piston rod lip seal assembly may include a lip seal including a circumferential lip configured to seal an inner diameter of the lip seal. The piston rod lip seal assembly may be configured for lateral motion of a piston rod within a housing component, and the lateral motion may be perpendicular to an axis of the piston rod. The piston rod lip seal assembly may further include a heel, a circumferential outer ring, and a spring. The spring may be disposed between, and in contact with, the circumferential lip and the circumferential outer ring. The piston rod lip seal assembly may further include a wave spring configured for face contact with a housing component.

14 Claims, 26 Drawing Sheets

(56)  References Cited

U.S. PATENT DOCUMENTS

| | | | |
|---|---|---|---|
| 4,103,909 A | 8/1978 | Hoffman | |
| 4,333,977 A | 6/1982 | Abrahams | |
| 4,355,519 A * | 10/1982 | Kercheval | F16J 9/06 |
| | | | 277/449 |
| 4,729,569 A | 3/1988 | Muller | |
| 5,058,487 A * | 10/1991 | Faitel | B30B 15/0064 |
| | | | 92/240 |
| 5,144,882 A | 9/1992 | Weissgerber | |
| 5,163,692 A | 11/1992 | Schofield | |
| 6,641,141 B2 | 11/2003 | Schroeder | |
| 7,640,841 B2 | 1/2010 | An | |
| 7,770,898 B2 | 8/2010 | Dietle | |
| 8,349,959 B2 | 1/2013 | Racicot | |
| 8,603,411 B2 | 12/2013 | Racicot | |
| 9,109,703 B2 | 8/2015 | Dietle | |
| 9,206,900 B2 * | 12/2015 | Smith | F16J 9/26 |
| 9,360,112 B2 * | 6/2016 | Smith | F16J 9/12 |
| 9,371,927 B1 * | 6/2016 | Lattimer | F16K 17/0466 |
| 10,145,474 B2 | 12/2018 | Schuhmacher | |
| 10,760,687 B2 * | 9/2020 | Yamaguchi | F16J 15/48 |
| 10,935,141 B2 * | 3/2021 | Owens, Jr. | F16J 15/186 |
| 11,971,105 B2 * | 4/2024 | Randrianarivony | |
| | | | F16J 15/3236 |

| | | | |
|---|---|---|---|
| 2002/0163136 A1 | 11/2002 | Schroeder | |
| 2005/0126186 A1 * | 6/2005 | Sylvia | F25B 9/00 |
| | | | 60/520 |
| 2007/0013143 A1 | 1/2007 | Schroeder | |
| 2007/0176372 A1 | 8/2007 | Racicot | |
| 2007/0180987 A1 | 8/2007 | An | |
| 2007/0205563 A1 | 9/2007 | Dietle | |
| 2009/0001671 A1 | 1/2009 | Dietle | |
| 2010/0166582 A1 | 7/2010 | Racicot | |
| 2011/0012313 A1 * | 1/2011 | Lev | H01M 8/04089 |
| | | | 205/640 |
| 2012/0038113 A1 | 2/2012 | Dietle | |
| 2012/0211942 A1 * | 8/2012 | Smith | F16J 9/12 |
| | | | 277/300 |
| 2013/0170980 A1 | 7/2013 | Racicot | |
| 2015/0123351 A1 | 5/2015 | Nakamura | |
| 2016/0091091 A1 * | 3/2016 | Smith | F16J 9/22 |
| | | | 277/435 |
| 2017/0074403 A1 | 3/2017 | Almeida | |
| 2017/0175899 A1 | 6/2017 | Lee | |
| 2017/0219099 A1 | 8/2017 | Schuhmacher | |
| 2019/0085981 A1 * | 3/2019 | Yamaguchi | F16J 15/3284 |
| 2020/0256469 A1 * | 8/2020 | Owens, Jr. | F16J 15/3252 |
| 2022/0373089 A1 * | 11/2022 | Randrianarivony | F16L 27/093 |
| 2024/0376983 A1 * | 11/2024 | Mendes de Araujo | C25D 7/04 |

* cited by examiner

SECTION A-A

DETAIL F

DETAIL G

SECTION C-C

SECTION B-B

DETAIL I

DETAIL H

SECTION E-E

DETAIL J

DETAIL K

SECTION D-D

DETAIL M

SECTION L-L

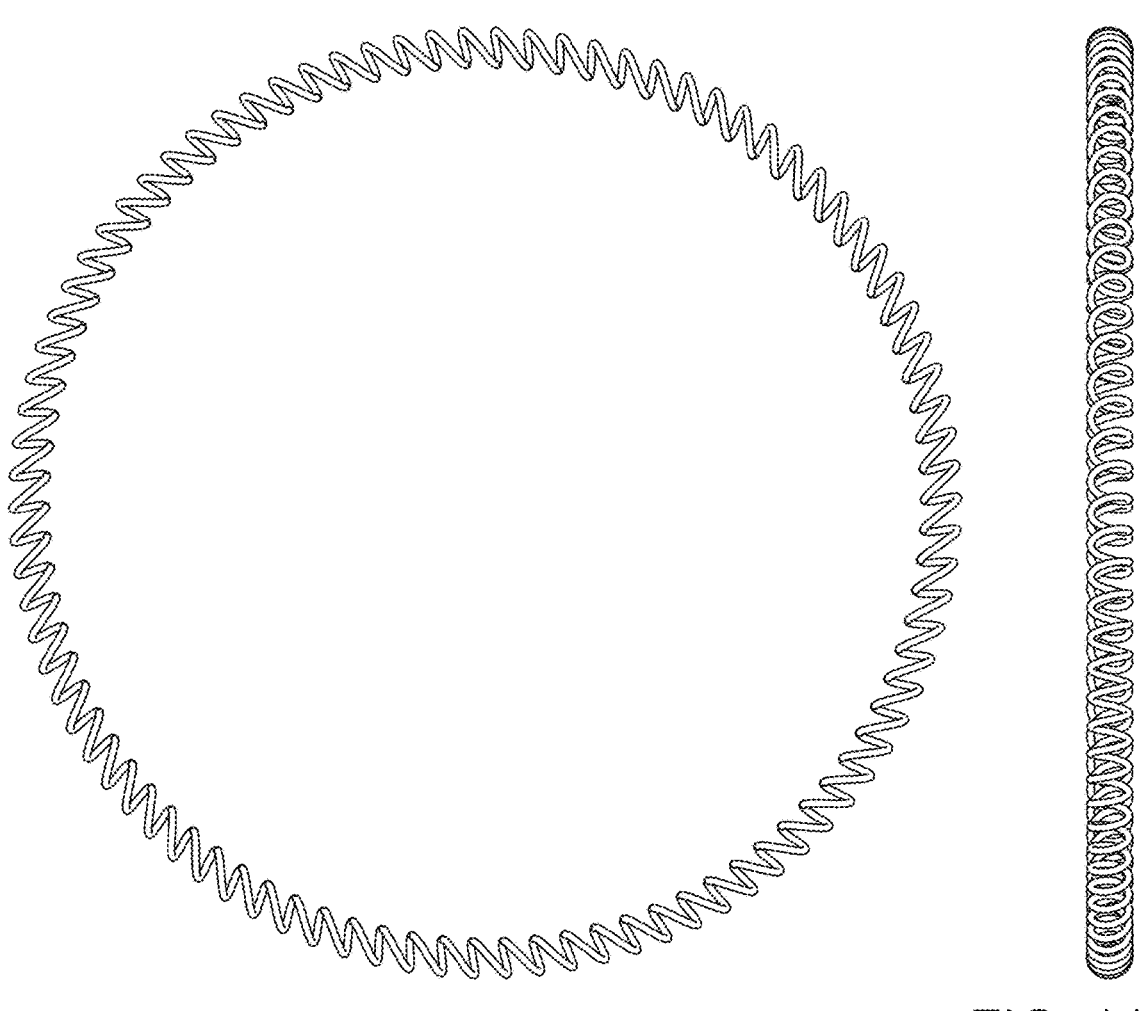
FIG. 11A
FIG. 11B

LATERALLY MOVEABLE COMPRESSOR PISTON ROD LIP SEAL ASSEMBLY

CROSS REFERENCE TO RELATED APPLICATIONS

This application is a continuation-in-part of U.S. patent application Ser. No. 18/141,880, filed on May 1, 2023, which claims the benefit of U.S. Provisional Application No. 63/337,433, filed on May 2, 2022. The entire content of the above-referenced application is hereby incorporated by reference.

TECHNICAL FIELD

Some example embodiments may generally relate to positive-displacement compressors. For example, certain example embodiments may relate to reciprocating and/or piston compressors.

BACKGROUND

In positive displacement reciprocating gas compressors, gas is compressed in a cylinder between suction up to discharge of the pressure by reciprocating motion on both ends of a double-acting piston. A piston rod (i.e., shaft) is fixed to a double-acting piston, and extends through an opening in a crank-end cylinder head. The piston rod is also connected to a drive train that provides the reciprocating motion. Some pistons also include a piston rod that extends from the other side of the piston through an opening in the head-end head. A pressure packing contains the high-pressure cylinder gas at an annular opening between the crank-end or head-end cylinder head and the piston rod. A wiper packing also prevents crankcase oil from seeping down the piston rod towards the cylinder.

SUMMARY

According to a first embodiment, a piston rod lip seal assembly may include a lip seal including a circumferential lip configured to seal an inner diameter of the lip seal. The piston rod lip seal assembly may further include a heel with clearance over a piston rod, a circumferential outer ring, and a face on a side opposite of the lip seal configured to seal with a housing component. The piston rod lip seal assembly may further include a spring. The spring may be disposed between, and in contact with, the circumferential lip and the outer ring.

In a variant, the piston rod lip seal assembly may further include a wave spring.

In a further variant, the piston rod lip seal assembly may also include a pilot.

According to a second embodiment, a piston rod lip seal assembly may include a lip seal including a first circumferential lip configured to seal an inner diameter of the lip seal, and a second circumferential lip configured to seal an outer diameter of the lip seal. The piston rod lip seal assembly may further include a heel and a spring. The spring may be disposed between, in contact with, and secured by the first circumferential lip and the second circumferential lip. The piston rod lip seal assembly may further include a seal carrier disposed around, and in contact with, an outer lip of the lip seal. The seal carrier may further be disposed around, and in contact with, the heel. The seal carrier may be disposed over a piston rod. The seal carrier may further include a protrusion configured to retain the lip seal axially, and a face on the side opposite from the protrusion that is configured to seal with the housing component.

According to a third embodiment, a piston rod lip seal assembly may include a lip seal including a first circumferential lip configured to seal an inner diameter of the lip seal, and a second circumferential lip configured to seal an outer diameter of the lip seal. The piston rod lip seal assembly may further include a heel including a notch disposed at an inner diameter for an anti-extrusion ring. The anti-extrusion ring may be disposed in the heel. The piston rod lip seal assembly may further include a spring disposed between the first circumferential lip and the second circumferential lip. The piston rod lip seal assembly may further include a seal carrier disposed around, and in sealing contact with, the second circumferential lip. The seal carrier may further be disposed behind, and in contact with, the heel and anti-extrusion ring. The seal carrier may be disposed over the piston rod.

In a variant, the outer ring may include a notch configured to vent gas to a cylinder or transfer oil.

In a variant, the seal carrier may include a notch configured to vent gas to a cylinder.

In a variant, the seal carrier may include a polymer material, a metal material, or a composite material.

In a variant, the spring may be a garter spring, a canted coil spring, a v-spring, an o-ring, and/or any other energizer.

In a variant, the seal carrier may include a pilot for a wave spring to apply an axial preload.

In a variant, the outer ring may include a pilot for a wave spring to apply an axial preload.

In a variant, the seal carrier may further include a protrusion configured to retain the lip seal axially, and a face on the side opposite from the protrusion that is configured to seal with the housing component.

In a variant, the lip seal may be pegged to a carrier so as to prevent relative rotation.

In a variant, the circumferential lip may include a plurality of points of contact.

In a variant, the piston rod lip seal assembly may be configured to seal oil and/or transfer oil away from the piston rod.

In a variant, the piston rod lip seal assembly may be configured for any diameter piston rod.

In a variant, the piston rod lip seal assembly may be housed in a cylinder in conjunction with a piston seal.

According to a fourth embodiment, a piston rod lip seal assembly may include a lip seal including a circumferential lip configured to seal an inner diameter of the lip seal. The piston rod lip seal assembly may be configured for lateral motion of a piston rod within a housing component, and the lateral motion may be perpendicular to an axis of the piston rod. The piston rod lip seal assembly may further include a heel, a circumferential outer ring, and a spring. The spring may be disposed between, and in contact with, the circumferential lip and the circumferential outer ring. The piston rod lip seal assembly may further include a wave spring configured for face contact with a housing component.

In a variant, a diametrical clearance between the outer diameter of the piston rod and the inner diameter of the housing component may be between 4-16% of the outer diameter of the piston rod, and a diametrical clearance between the outer diameter of the lip seal and the inner diameter of a groove of the housing component may be between 4-16% of the outer diameter of the piston rod.

In a variant, the circumferential outer ring may include a pilot that houses a wave spring configured to apply an axial preload.

3

In a variant, the piston rod lip seal assembly may further include a wave spring.

In a variant, the spring may include a canted coil spring.

In a variant, the piston rod lip seal assembly may be configured to at least one of seal oil or transfer oil away from the piston rod.

In a variant, the piston rod lip seal assembly may include at least one slot in the heel configured to transfer oil.

According to a fifth embodiment, a piston rod lip seal assembly may include a lip seal including a first circumferential lip configured to seal an inner diameter of the lip seal, and a second circumferential lip configured to seal an outer diameter of the lip seal. The piston rod lip seal assembly may be configured for lateral motion of a piston rod within a housing component. The lateral motion may be perpendicular to an axis of the piston rod. The piston rod lip seal assembly may further include a heel, a spring, and a seal carrier disposed around, and in contact with, the second circumferential lip of the lip seal. The spring may be disposed between, in contact with, and secured by the first circumferential lip and the second circumferential lip. The seal carrier may further be disposed around, and in contact with, the heel. The seal carrier may further include a protrusion configured to retain the lip seal axially.

In a variant, a diametrical clearance between the outer diameter of the piston rod and the inner diameter of the housing component may be between 4-16% of the outer diameter of the piston rod, and a diametrical clearance between the outer diameter of the seal carrier and the inner diameter of a groove of the housing component may be between 4-16% of the outer diameter of the piston rod.

In a variant, the heel may include a notch disposed at an inner diameter of the lip seal. An anti-extrusion ring may be housed in the notch.

In a variant, the seal carrier may include a sealing face, and the housing component may include a sealing face.

In a further variant, the sealing face of the seal carrier and the sealing face of the housing component may form a seal.

In a further variant, a topology of the sealing face of the seal carrier may be a maximum of 20 roughness average (Ra) micro-inches (μ-in), and a maximum of 0.0000696" flatness, and a topology of the sealing face of the housing component may be a maximum of 20 roughness average (Ra) micro-inches (μ-in), and a maximum of 0.0000696" flatness.

In a variant, the diametrical clearance between the inner diameter of the seal carrier and the outer diameter of the piston rod may be 0.40%-1.80% of the outer diameter of the piston rod.

In a variant, the seal carrier may further include at least one protrusion.

In a further variant, the protrusion may be angled between 20-30 degrees from a face of the seal carrier, and may extend 0.005"-0.020" radially inward from the sealing diameter of the seal carrier.

In a variant, the lip seal may be pegged to a carrier so as to prevent relative rotation.

In a variant, the spring may include a canted coil spring.

In a variant, the seal carrier may include a polymer material, a metal material, or a composite material.

In a variant, the seal carrier may include a pilot that houses a wave spring configured to apply an axial preload.

According to a sixth embodiment, a piston rod lip seal assembly may include a lip seal including a first circumferential lip configured to seal an inner diameter of the lip seal, and a second circumferential lip configured to seal an outer diameter of the lip seal. The piston rod lip seal assembly may be configured for lateral motion of a piston rod within a housing component. The lateral motion may be perpendicular to an axis of the piston rod. The piston rod lip seal assembly may further include a heel, a spring, and a seal carrier disposed around, and in contact with, the second circumferential lip of the lip seal. The spring may be disposed between, in contact with, and secured by the first circumferential lip and the second circumferential lip. The seal carrier may further be disposed around, and in contact with, the heel. The seal carrier may further include a protrusion configured to retain the lip seal axially. A diametrical clearance between the outer diameter of the piston rod and the inner diameter of the housing component may be between 4-16% of the outer diameter of the piston rod, and a diametrical clearance between the outer diameter of the seal carrier and the inner diameter of a groove of the housing component may be between 4-16% of the outer diameter of the piston rod. The seal carrier may include a sealing face, and the housing component may include a sealing face. A topology of the sealing face of the seal carrier may be a maximum of 20 roughness average (Ra) micro-inches (μ-in), and a maximum of 0.0000696" flatness. A topology of the sealing face of the housing component may be a maximum of 20 roughness average (Ra) micro-inches (μ-in), and a maximum of 0.0000696" flatness.

BRIEF DESCRIPTION OF THE DRAWINGS

For a proper understanding of example embodiments, reference should be made to the accompanying drawings, wherein:

FIG. 11A illustrates a front view of the canted coil spring showing how the pitch of the coil is canted to the left according to some example embodiments; and FIG. 11B illustrates a side view of a canted coil spring according to various example embodiments.

DETAILED DESCRIPTION

Figures 1A, 1B, 1C, 1D, 1E, 1F:
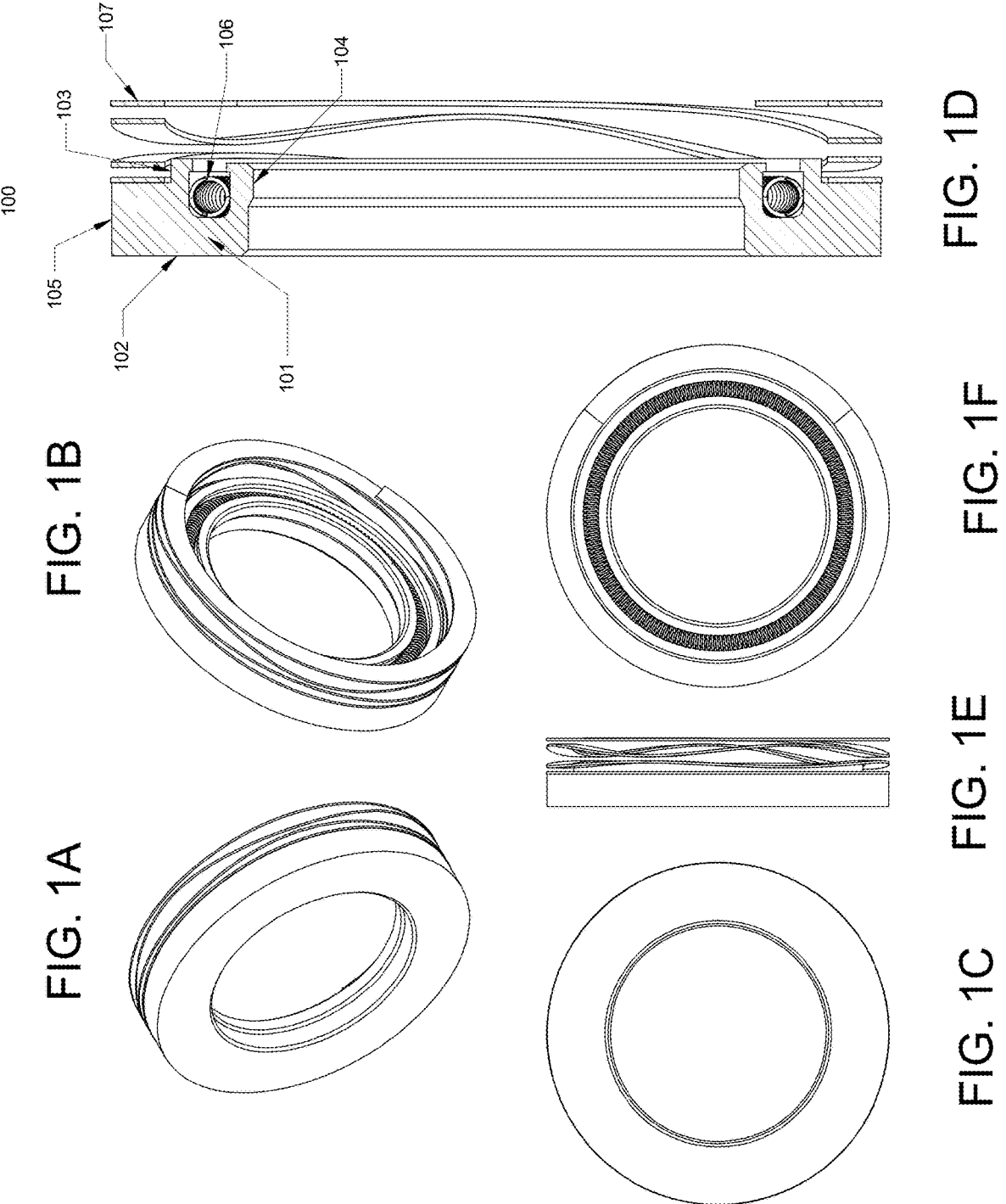
FIG. 1A illustrates a perspective view of a first embodiment.
FIG. 1B illustrates another perspective view of the first embodiment.
FIG. 1C illustrates a rear view of the first embodiment.
FIG. 1D illustrates a left-side cross-section view of the first embodiment.
FIG. 1E illustrates a left-side view of the first embodiment.
FIG. 1F illustrates a front view of the first embodiment.

It will be readily understood that the components of certain example embodiments, as generally described and illustrated in the figures herein, may be arranged and designed in a wide variety of different configurations. Thus, the following detailed description of some example embodiments related to laterally moveable compressor piston rod lip seals is not intended to limit the scope of certain example embodiments, but is instead representative of selected example embodiments.

In the field of compressor packings, "packing" generally refers to components that are packed around a shaft and held in place to provide a seal. Current pressure packings can include an assembly of seals and housing components that seal high-pressure cylinder gas, and divert any leakage into a vent gas system for disposal or further processing. In general, a pressure packing can include a dynamic pressure breaker, at least three high-pressure packing ring sets (i.e., seals), a vent or purge ring set, and optionally an oil wiper, all of which are housed in housing components or grooves within the assembly. While the housing components can be metallic, the sealing elements can be made of a filled polymer (e.g., carbon black, graphite fiber, metal particles, metal oxide particles) in order to improve flexibility, chemical resistance, and anti-wear properties. Furthermore, a gasket may form a seal between the pressure packing and the crank-end or head-end head, while a flange with bolts can secure the entire pressure packing in place.

A dynamic pressure breaker may include an orifice that restricts the flow of dynamic gas pressure (i.e., difference between suction pressure and discharge pressure) into the pressure packing, thereby reducing the pressure from discharge down to approximately the suction pressure. Pressure breakers generally have three segments around the piston rod that are held together, and in contact with, the piston rod via a spring on the outer diameter. When installed on the piston rod, gaps between segments between the piston rod and the packing housing component (e.g., cup) can form the orifice.

A pressure packing may include at least three high-pressure packing ring sets, which may serve as the main gas seals. In general, only one packing ring set may form the seal from approximately suction pressure down to atmosphere, while addition packing ring sets can be used for additional longevity. Each packing ring set may include three or four individual rings, where the first two individual sealing rings are segmented, and when combined, may create a seal. The third and/or fourth individual sealing rings may be segmented or solid, and can be used either as a seal or as structural support. Each individual ring may only be capable of providing a reliable seal when combined into a ring set. While dynamically operating, gas leakage rates through the high-pressure packing ring sets can be between 5 to 45 standard cubic feet per hour (SCFH), which can be measured using a flow meter.

Depending on the combination of individual rings in a set, the set may or may not be able to form a seal statically while the compressor is not operating. A separate static seal may be included in the pressure packing if the compressor needs to contain high-pressure cylinder gas in the absence of reciprocating piston rod motion. Static seals may be actuated by auxiliary gas pressure to perform on-demand. However, this type of static seal is complicated to operate, unreliable, and has limited longevity.

Low-pressure gas leakage through the pressure packing may be sealed by a single vent ring set, and diverted into a vent gas system. Since gas pressure at the vent ring is relatively low, and friction of the vent ring set with the piston rod is relatively high, an axial preload from a wedge, coil springs, or a wave spring may be required to prevent the ring set from shuttling in the groove and leaking. The vent ring set may include two individual segmented sealing rings that, when combined with the axial preload, can form a seal.

Dynamic pressure breakers and high-pressure packing ring sets may need to be in contact with the piston rod and packing housing component to be ready to energize and form a seal. Radial contact with the piston rod and circumferential (i.e., tangential) contact between the sealing segments may be created by a spring on the outer diameter, while intermittent axial contact between individual rings and the housing component may be created via reciprocating piston rod motion. High-pressure cylinder gas may energize the dynamic pressure breaker and high-pressure packing ring sets in the radial, circumferential, and axial directions in order to form a seal. Vent ring sets may be held in radial contact with the piston rod, and circumferential contact between the sealing segments. The vent ring sets may be energized by a spring on the outer diameter, while also being held in axial contact with the housing component, and energized by an axial preload from a wedge, coil springs, or a wave spring.

High-pressure packing ring sets may be broken into two types: segmented rings, and a hybrid combination of segmented and solid rings. Segmented rings may use three individual rings in a set. The first individual ring may be segmented into three pieces around the piston rod with radial gaps, and may be held together with a spring on the outer diameter. The radial gaps in the first individual ring may allow gas to flow into the housing component and on top of the ring set for energization, and to vent back to the cylinder when not needed. Oil injected into a lubricated packing may pass through the vented path into the cylinder. The second individual ring may be segmented into three pieces with partial radial gaps that transition to a tangential cut, and may be held together with a spring on the outer diameter. The first two individual rings may be pegged together to phase the radial gaps, and may be the minimum combination of individual rings capable of forming a seal. The third individual ring may be segmented into three radial pieces without gaps between segments, may have clearance of the piston rod, may provide structural support, and may continue the seal formed by the first two individual rings (but may be incapable of forming the seal itself). The third individual ring may contact the piston rod, and hang from gravity. Specifically, the third individual ring may only be in contact with the piston rod at a single point by the ring pulled down by gravity; the third individual ring may be metallic, and without sufficient lubricant, can result in significant damage when in contact with the metal piston rod. Since many segments may be individually manufactured and assembled to form a seal, inherent leak paths may exist through which gas may escape the seal. In addition, segments may thermally develop from radial contact with the piston rod and/or circumferential (i.e., tangential) contact between segments, resulting in a loss of seal function. Segmented rings may also be relatively expensive to manufacture.

Furthermore, segmented rings may self-adjust after significant wear on the inner diameter of the sealing segments, thereby increasing longevity. Segmented rings were initially constructed with materials having high wear rates, and needed to meet the requirements for life expectations of compressor operators. Segmented rings also were mandated by American Petroleum Institute (API) standards such that packing rings could be installed with the piston rod still intact. However, many compressors can be difficult to maintain, and may need packing ring sets that can be installed with the piston rod intact. Other compressors have piston rods that may not be inserted through solid seals.

As noted above, high-pressure packing ring sets may include a second type having a hybrid combination of segmented and solid rings. In general, a hybrid combination may use four individual rings in a set. The first and second individual rings may be segmented, as discussed above, and may be capable of forming a seal. The third individual ring may be solid, radially and/or circumferentially rigid, and axially flexible, which may require clearance on the inner diameter for insertion of the piston rod. With the first two individual rings energized, radial and axial differential pressure may be created across the third individual ring, which, when high enough, may force the ring to collapse radially, and dish axially into sealing contact of the leading edge with the piston rod, which may result in the seal of the first two rings to break. The fourth individual ring may be solid with clearance over the piston rod, may provide structural support, and may continue the seal formed by the first three rings, but may be unable to form a seal by itself. The fourth individual ring may contact the piston rod and hang from gravity. Thus, this type of packing ring set may be a hybrid of segmented and solid seals since the third solid ring may rely on the first two segmented rings to move the radial and circumferential sealing edge/surface of the third solid ring into contact with the piston rod and to energize. When energized at a high enough pressure, this type of solid ring seal may have minimal or no inherent leak paths, lower gas leakage rates, and lower heat generation, but may have very low wear volume compared to segmented packing rings. Although this solid sealing ring is larger, only a few thousandths of an inch of the leading edge may be consumed by wear before a loss of function occurs. The solid sealing ring may also wear rapidly from excessive dishing, resulting in a loss of seal function and failure. Low wear volume may also reduce longevity.

In a lubricated application, individual structural rings may be metallic to improve anti-extrusion resistance at high pressures, revolutions per minute (RPMs), and temperatures. In an oil-free application, this ring may be made of a filled polymer to minimize wear from contact with the reciprocating piston rod. Filled polymers may not be as strong as metallic materials, which may necessitate a reduction in operating pressure, RPM, and temperature in oil-free applications.

Radial clearance may exist in the drive train between crosshead shoes and the slide bore in the crosshead guide, as well as between the outer diameter of the piston and the cylinder bore. Forces exerted on the crosshead from the connecting rod may cause the crosshead to move up and down within clearances. Uneven compression across the face of the piston may also cause the piston to rock, which may result in bending of the attached piston rod. With the assembly clearances, excitations of the crosshead and piston, and the dynamic nature of operating a reciprocating compressor, some amount of lateral piston rod motion (e.g., perpendicular to the axis of the piston rod) may occur during operation. Lateral piston rod motion may move the sealing segments out of radial contact with the piston rod, providing opportunities for gas to leak or compress the sealing elements radially into the housing component and beyond their structural limit, providing additional failure and leakage. All sealing elements in the pressure or wiper packing may thus be capable of moving within the housing component with the lateral motion of the piston rod in order to maintain a seal with the piston rod.

Current wiper packings may include an assembly of seals and housing components that wipe lubricant oil from the piston rod, transfer the oil back to the crankcase, and prevent any cylinder gas from leaking into the crankcase. In general, a wiper packing may include an oil wiper ring set and a vent ring set, which may be housed in housing components within the assembly. Oil wiper ring sets may use segmented rings, which may be similar to the segmented seals described above, although the oil wiper rings may be configured to transfer oil. Individual wiping rings may have two wiping lands on the inner diameter, as well as multiple drainage slots and holes to transfer oil radially away from the piston rod. Segmented oil wipers may transfer the bulk of the lubricant oil from the piston rod back to the crankcase, but also leak a significant amount of oil. The wiping and sealing elements may be made of a filled polymer, while the housing components may be metallic. Bolts may secure the entire wiper packing assembly in place near the crankcase.

Packing ring and oil wiper sets may be housed in housing components for functionality; however, since the housing components may have a significantly longer lifespan than the packing rings and oil wiper sets, the ring sets may be available without housing components for maintenance. When worn out, metal packing housing components may be re-machined during maintenance to satisfy new specifications, but packing ring and oil wiper sets may be disposed, and new ring sets may be required.

Certain example embodiments described herein may have various benefits and/or advantages to overcome the disadvantages described above. For example, certain example embodiments may provide near-zero gas leakage rate, which may be significantly lower than segmented rings or a hybrid of segmented and solid rings. Some example embodiments may also reduce greenhouse gas emissions, and may not rely on other technologies to maintain contact with the sealing surfaces prior to energization. In addition, various example embodiments may maintain near-zero leakage rates at most operating design pressures, temperatures, and speeds, including at zero RPM. Certain example embodiments may also distribute pressure across multiple seals during or after operation, and may not require additional hardware or systems to maintain near-zero leakage after the compressor is shutdown to restarted. Furthermore, some example embodiments may provide higher pressure, speed, and temperature operation in an oil-free compressor. Various example embodiments may also lower oil consumption for lubricated applications. Some example embodiments may be configured for any diameter piston rod. In addition, certain example embodiments may be housed in a cylinder in conjunction with a piston seal.

Certain example embodiments may be more capable of building a hydrodynamic oil film during operation for additional load carrying, and may wipe more oil from the piston rod compared to traditional segmented oil wipers. In some example embodiments, more wear volume may be achieved compared to solid sealing rings with a hybrid of segmented and solid rings, lower heat generation than segmented rings alone, and improved heat transfer from the lip seal through the carrier to the housing component assembly. In addition, various example embodiments may experience fewer failure modes, may have longer lifespans, may require fewer seals to achieve the same performance, and may be less expensive.

Packing ring sets may need to conform with API 618 mandate requiring packing ring sets to be designed for installation with a piston rod in place. Some existing compressors are difficult to maintain, and may require packing ring sets that may be installed with the piston rod in place. Some existing packing ring sets may also rely on multi-part assemblies to enable all of the rings and springs of the packing ring sets to be installed with the piston rod in place. In contrast, various example embodiments described herein include packing ring sets that may be installed with the piston rod removed.

Various example embodiments discussed herein also provide more wear volume than a solid sealing ring. When coupled with polymer materials, lubricants, piston rod coatings, and lip seal designs, only a small amount of wear may occur to meet the longevity goals of compressor operators.

Furthermore, lip seals may fail prematurely when used in a laterally fixed configuration on a reciprocating shaft with lateral motion. The use of a laterally-movable seal carrier may add another leak path between the carrier and the housing component face, which may not provide a secure sealing solution; such an additional leak path may be where a quasi-static seal can be made, which may provide near-zero leakage compared to traditional dynamic seals.

In certain example embodiments, a reciprocating gas compressor may include a piston rod sealing assembly with high-pressure cylinder gas at an annular opening between the piston rod and a crank-end or head-end cylinder head. The piston rod sealing assembly may include a dynamic pressure breaker, at least two main seals, a vent or purge seal, and optionally an oil seal, with each housed in its own housing component or groove to loosely constrain its axial and radial position within the assembly. The dynamic pressure breaker may reduce the pressure from discharge down to approximately suction pressure. When configured as main seals, various example embodiments may reduce the pressure in the piston rod sealing assembly from approximately suction pressure down to atmosphere. When configured as main seals, some example embodiments may also seal discharge pressure down to atmosphere if a dynamic pressure breaker is omitted from the assembly. When configured as a vent seal, various example embodiments may capture leakage beyond the main seals, and force leakage into a vent gas system for disposal or further processing. Similarly, when configured as a purge seal, some example embodiments may contain purge gas for a positive pressure version of a vent seal, thereby capturing more of the leakage beyond the main seals and forcing the leakage into a vent gas system. Furthermore, when configured to seal oil from the crankcase, certain example embodiments may be included in an assembly that lacks a separate oil seal assembly positioned near the compressor crankcase.

In various example embodiments, a gasket may form a seal between the piston rod sealing assembly and the head, while a flange with bolts may hold in place the entire assembly of the housing components, plates, and flange. When used in a separate oil seal assembly, bolts may hold in place a metallic component used in oil seals or intermediate assemblies (e.g., gland, flange) against the crankcase (e.g., with an o-ring seal) between the crankcase and gland. The piston rod may then be inserted through the piston rod sealing assembly, or oil seal assembly which includes the piston rod lip seal assembly, which may generate near-zero gas leakage, consume minimal quantities of lubrication, and provide increased longevity.

Some example embodiments may include a separate seal carrier for operating conditions that require the seal carrier so as to provide greater strength or stiffness than an integrated seal carrier. An integrated seal carrier may be used if operating conditions would otherwise allow the seal carrier to be made of the same filled polymer as the lip seal. Lip seals may be made of a filled polymer that can improve flexibility, chemical resistance, and anti-wear properties. The vent, purge, and oil seal applications may be used with an integrated seal carrier. For applications where greater strength or stiffness of the carrier are desired, various example embodiments may be configured with a separate seal carrier made from a higher duty polymer, composite or metal. Generally, the main seals may be configured with a separate seal carrier.

Some separate seal carriers may be configured with a notch to vent gas to a cylinder, if the gas is not needed to form a seal. Also, some configurations with a separate seal carrier may have a peg between the seal carrier and the lip seal to prevent relative rotation if relative rotation would increase wear. If configured with a separate seal carrier, the heel of the lip seal may be inserted into a generally metallic seal carrier, and axial force may be applied until it snaps into place past a protrusion (e.g., barb) in the carrier. The protrusion in the seal carrier may secure the lip seal axially by the outer lip, and prevent the seal from shuttling axially with reciprocating motion in the absence of a differential pressure. The protrusion may protrude radially inward from the inner sealing diameter in the carrier, and may be circumferentially continuous. The protrusion may have a lead-in of any angle, such as between 20° and 30°, to aid in installation of the seal past the protrusion. A shallower lead-in angle may require too much axial length to fit in the assembly, while a steeper angle may provide too much resistance during installation of the seal past the protrusion. The protrusion may protrude radially inward from the inner sealing diameter in the carrier, such as between 0.005" and 0.020". A protrusion height less than 0.005" may be insufficient to retain the seal, while a protrusion greater than 0.020" may provide too much resistance during installation of the seal past the protrusion to the point that damage to the lip seal may occur. The side of the protrusion that retains the lip seal may be substantially square to prevent the seal from popping out of the carrier past the protrusion.

Further, some example embodiments may have a lip seal with circumferential lip including a plurality of points of contact to improve seal strength.

Pressure breakers, main, vent, purge, and oil seals (i.e., seals) may be housed in an annular groove between housing components (e.g., cups, plates, a flange, a gland), and the piston rod may loosely constrain their axial and radial (i.e., lateral) positions within the piston rod and/or oil sealing assemblies.

In certain example embodiments, housing components may be made of metallic materials (e.g., iron, gold, titanium) and composites thereof. The axial clearance between the seals and the groove may be sufficient to prevent axial contact (i.e., pinching) caused by thermal expansion of the seals. The seals and carriers may be made of materials that have an equal or higher coefficient of thermal expansion compared to the housing components (e.g., aluminum, ethylene ethyl acrylate, polymers).

To overcome these disadvantages, in certain example embodiments, the diametrical clearance between the outside diameter of the piston rod and the inside diameter of the housing components, as well as the diametrical clearance between the outside diameter of the seals and the inside diameter of the groove, may allow the seals to move laterally (i.e., radially) in the groove, with lateral piston rod motion during compressor operation. As an example, the diametrical clearance at both locations may range between 4.00-16.00% of the piston rod diameter. As a result, the seals may be free to move laterally with the piston rod, within this diametrical clearance when the compressor is operating.

If the diametrical clearance is less than the maximum lateral piston rod motion, there may be contact between the outer diameter of the piston rod and the inside diameter of the housing components, as well as between the outer diameter of the seals and the inner diameter of the groove. Such undesirable contact may result in premature piston rod wear, the seals may suffer structural damage from contact with the inner diameter of the groove, and/or the seals may separate from the piston rod, thereby causing leaks. Conversely, excessive diametrical clearance may cause extrusion or deflection of the seals into the clearance, leading to leakage and seal failure.

In certain example embodiments, sealing surfaces may be in radial, circumferential, and/or axial contact in order to properly energize and form a seal. All sealing surfaces may be in contact with each other to form a seal. For example, a lip seal may be radially and circumferential flexible, but axially stiff. When the piston rod is installed, the lips may be secured with the piston rod and the seal carrier with radial and circumferential interfering geometry, and radial force from the canted coil spring, with no additional requirements to energize in the radial and circumferential directions. At least one protrusion in the seal carrier may retain the lip seal axially, thereby securing the lip seal in the seal carrier while the piston rod may reciprocate without seal energization in the axial direction. Reciprocating piston rod motion may place the seal carrier face into intermittent axial contact with the housing component face.

In various example embodiments, a seal may be formed (i.e., energized) or maintained when the contact pressure between sealing surfaces may be equal to or greater than the differential pressure being contained. Static seals may have a lower leakage than dynamic seals since there may be no motion between sealing surfaces. Dynamic seals may have more leakage compared to static seals since the motion between sealing surfaces with imperfections may allow more leakage through such imperfections. Leakage along surfaces with imperfections may be reduced with increased contact pressure. Lip seals may have zero or near-zero leakage due to no inherent leak paths through the solid seal technology.

Various example embodiments may include formed seals (e.g., while energized) with the seals being maintained by high-pressure cylinder gas in the radial, circumferential, and/or axial directions, with the assistance in the radial direction by forces from a canted coil spring (e.g., canted coil spring 1100, as illustrated in FIG. 11) between the lips of the seal. Various example embodiments may provide immediate energization once pressure is applied such that the energization pressure can't be measured with pressure sensors. Inner lips of the seal may form a dynamic seal with the piston rod, while outer lips may form a static seal with the seal carrier (if applicable). When using a separate seal and carrier configuration, while the heel of the lip seal may exert force on the seal carrier, contacting faces may not form a primary seal. The other face of the seal carrier (e.g., separate or integral) may form a quasi-static seal with the housing component face. Thus, a seal formed may be static, except for minimal displacement lateral motion (i.e., perpendicular to the axis of the piston rod) that may be driven by the piston rod. The laterally moveable seal carrier may allow the inner lip seal to move along with lateral motion of the piston rod in order to maintain the seals. Thus, the laterally moveable seal carrier may enable lip seals to be applied in reciprocating gas compressors.

To improve the functioning of the main seals, the face of the separate carrier that makes contact with the face of the housing component when energized, and the face of the housing component that makes contact with the face of the carrier when energized, may be sufficiently flat and smooth. In the absence of a seal or gasket between these mating faces, a seal can be maintained if the faces are sufficiently flat and smooth to minimize or eliminate leak paths. Proper functioning of the main seals may provide near-zero leakage, as well as pressure sharing almost equally across as many main seals are in the piston rod sealing assembly both dynamically when the compressor is operating and statically when the compressor is at zero RPM with gas pressure still applied. In various example embodiments, for proper functioning of the main seals, a topology (i.e., surface geometry) of the sealing face of the seal carrier may be a maximum of 20 roughness average (Ra) micro-inches (μ-in) and a maximum of 0.0000696" flatness, and/or a topology of the sealing face of the housing component may be a maximum of 20 roughness average (Ra) micro-inches (μ-in) and a maximum of 0.0000696" flatness. Thus, the pressure sharing phenomenon was determined to occur due to a tight and consistent seal. Without sufficiently flat and smooth mating surfaces, pressure sharing may be limited to only as many seals as there are types of differential pressure to energize them. Differential pressure may be dynamic (i.e., difference between discharge and suction pressure which fluctuates with each stroke) and static (i.e., difference between suction and atmosphere which does not change).

As noted above, lip seals may provide consistent, near-zero leakage rates. Since lip seals may form a tight and consistent seal, multiple seals may be used in the piston rod sealing assembly to share the pressure. Such pressure sharing may allow operation at pressures higher than what an individual seal is capable of, and/or may increase longevity by reducing the load on each seal.

So long as cylinder pressure is continuously applied to the piston rod sealing assembly, various example embodiments may maintain near-zero leakage rates, and/or may share pressure across multiple embodiments after the compressor stops rotating (i.e., zero RPM). Thus, various example embodiments may maintain near-zero leakage rates while the compressor is re-started without depressurizing the cylinder.

In order to improve optimum performance in a lubricated application, oil may be injected between a minimum of two lip seals. If more than two main seals are included, the oil may be generally injected in front of the last main seal. Injecting oil in front of the last main seal uses the oil more efficiently by passing over more seals before it makes its way into the cylinder. Certain example embodiments may prevent gas and oil from leaking to low-pressure vent locations, while also sealing gas and oil from venting to the cylinder. Trapping oil between lip seals may result in high oil levels in the piston rod sealing assembly, which in turn may result in low heat generation, low wear rates, and increased longevity. The natural retention of oil between lip seals may not require significant oil to maintain a consistently high level. The shape of the lips and/or the radially/ circumferentially flexible nature of the design of the lip seals may increase hydrodynamic oil film pressure between the reciprocating piston rod and the inner lip to add load carrying capacity.

In some example embodiments, the concentric geometry of the lip seal as installed in the seal carrier may center the seal carrier with uniform clearance around the piston rod. The seal carrier may be solid and/or have a diametrical clearance over the piston rod. The diametrical clearance over the piston rod may range between 0.40%-1.80% of the piston rod diameter. The clearance between the carrier inner diameter and the piston rod outer diameter may function as a buffer to prevent the carrier inner diameter from contacting the piston rod outer diameter until sufficient radial force or asymmetric wear on the inner lip pulls the carrier inner diameter into contact with the piston rod outer diameter. Since a metallic seal carrier may not be in contact with the piston rod, and a filled polymer may generate less frictional heat compared to a metallic seal carrier, the configuration of the lip seals may result in less heat generation, require less oil, and may allow for higher pressure, RPMs, and temperature operation in oil-free applications.

Furthermore, the clearance between the seal carrier and piston rod may create an extrusion gap. At pressure and temperatures exceeding certain thresholds, the heel of the lip seal may begin to extrude from differential pressure into the clearance. A solid anti-extrusion ring made from a higher duty material may be installed in the heel of the lip seal and cover the extrusion gap in order to delay extrusion of the heel until more extreme operating conditions.

Frictional heat may be generated by the reciprocating motion of the piston rod against an inner lip. Heat may then be transferred through a lip seal radially and axially to the seal carrier, and then into the housing component. A metallic seal carrier may provide an efficient thermal path around the outer lip, and behind the heel of the lip seal for heat transfer into the housing. Since differential pressure multiplexed by the contact area between the seal and the piston rod may determine the normal force, lower frictional forces may occur by minimizing the axial length of contact between the seal and the piston rod.

Since the lip seal may be radially and circumferentially flexible, the lip seal may flex to adjust for radial wear of the inner lip to maintain sealing functions. Tens of thousands of an inch of the inner lip may be consumed from wear. Although the lip seal may appear smaller in overall size than a solid sealing ring in hybrid technology, the lip seal may have many times more wear volume, which may contribute to its longevity.

Some primary failure modes of segmented and hybrid packing ring technology may be minimized or eliminated by certain example embodiments described herein. Since there are no segments in a lip seal, there is a reduced risk of failure due to thermal expansion of segments growing out of sealing contact with the piston rod or other segments, resulting in a loss of sealing function. Since the stiffness of a lip seal is radially and circumferentially flexible, and axially stiff, the lip seal may not fail from dishing and/or rapid wear resulting in a loss of sealing function.

Various example embodiments may be configured in a piston rod oil seal assembly next to the crankcase. The piston rod oil seal assembly may include an oil seal and a vent or purge seal, each housed in its own housing component to loosely constrain its axial and radial (lateral) position within the piston rod oil seal assembly. Certain example embodiments may wipe lubricant oil on the piston rod in the circumferential and axial directions, transfer oil radially away from the piston rod and back to the crankcase, and produce near-zero oil leakage. Some example embodiments may experience small displacement reciprocating motion in the groove. The vent or purge seal may stop any cylinder gas leakage past the piston rod oil sealing assembly from entering the crankcase. Various example embodiments may also be used as both an oil seal and a vent or purge seal when an axial preload is applied.

FIGS. 1A-1F illustrate a first example embodiment of a piston rod lip seal assembly. In particular, FIG. 1A illustrates a perspective view of a first example embodiment; FIG. 1B illustrates another perspective view of the first example embodiment; FIG. 1C illustrates a rear view of the first example embodiment; FIG. 1D illustrates a left-side cross-section view of the first example embodiment; FIG. 1E illustrates a left-side view of the first example embodiment; and FIG. 1F illustrates a front view of the first example embodiment.

FIG. 1D illustrates the elements of an example embodiment of a piston rod lip seal assembly 100 with integrated seal carrier 101. The heel of integrated seal carrier 102 may create a face to seal with a housing component (not shown). Canted coil spring 106 (e.g., canted coil spring 1100, as illustrated in FIG. 11) may be disposed between inner circumferential sealing lip 104 and circumferential outer ring 105. An inner diameter of wave spring 107 may fit around wave spring pilot diameter 103, and may be in face contact with circumferential outer ring 105. The other side of wave spring 107 may be in face contact with the housing component.

Figures 2A, 2B, 2C, 2D, 2E, 2F:
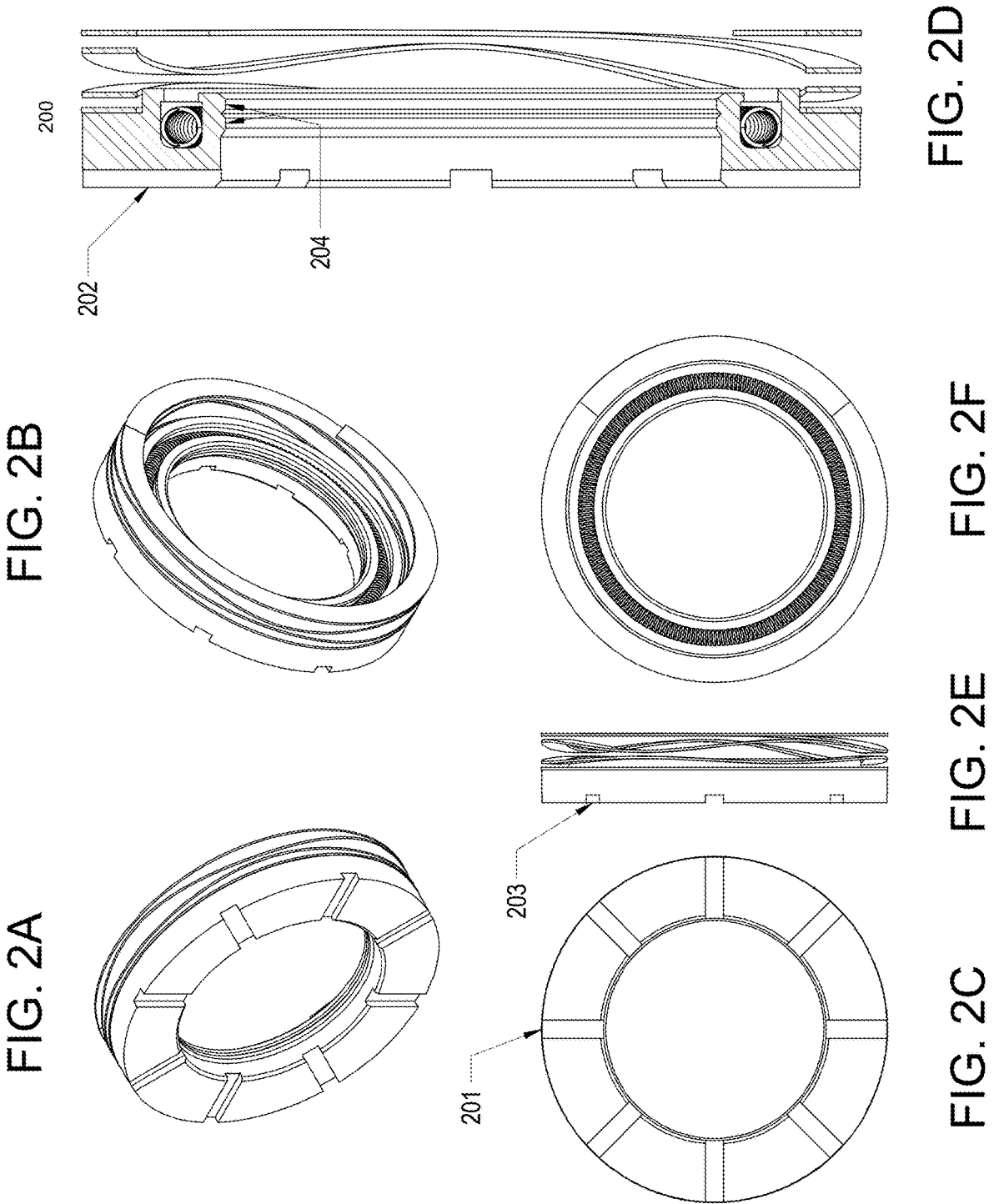
FIG. 2A illustrates a perspective view of the first embodiment with slots.
FIG. 2B illustrates another perspective view of the first embodiment with slots.
FIG. 2C illustrates a rear view of the first embodiment with slots.
FIG. 2D illustrates a left-side cross-section view of the first embodiment with slots.
FIG. 2E illustrates a left-side view of the first embodiment with slots.
FIG. 2F illustrates a front view of the first embodiment with slots.

FIGS. 2A-2F depict variations of the first example embodiment shown in FIGS. 1A-1F with slots. Specifically, FIG. 2A illustrates a perspective view of the first example embodiment with slots, FIG. 2B illustrates another perspective view of the first example embodiment with slots, FIG. 2C illustrates a rear view of the first example embodiment with slots, FIG. 2D illustrates a left-side cross-section view of the first example embodiment with slots, FIG. 2E illustrates a left-side view of the first example embodiment with slots, and FIG. 2F illustrates a front view of the first example embodiment with slots.

FIG. 2C depicts slot 201 from a rear view, FIG. 2D depicts slot 202 in a left-side cross-section view, and FIG. 2E depicts slot 203 from a left-side view. Slots 201, 202, and 203 may be similar, and may be configured to transfer oil radially away from the piston rod. FIG. 2D further depicts a plurality of points of contact 204 at an inner circumferential sealing lip of piston rod lip seal assembly 200.

Figures 3A, 3B, 3C, 3D, 3E:
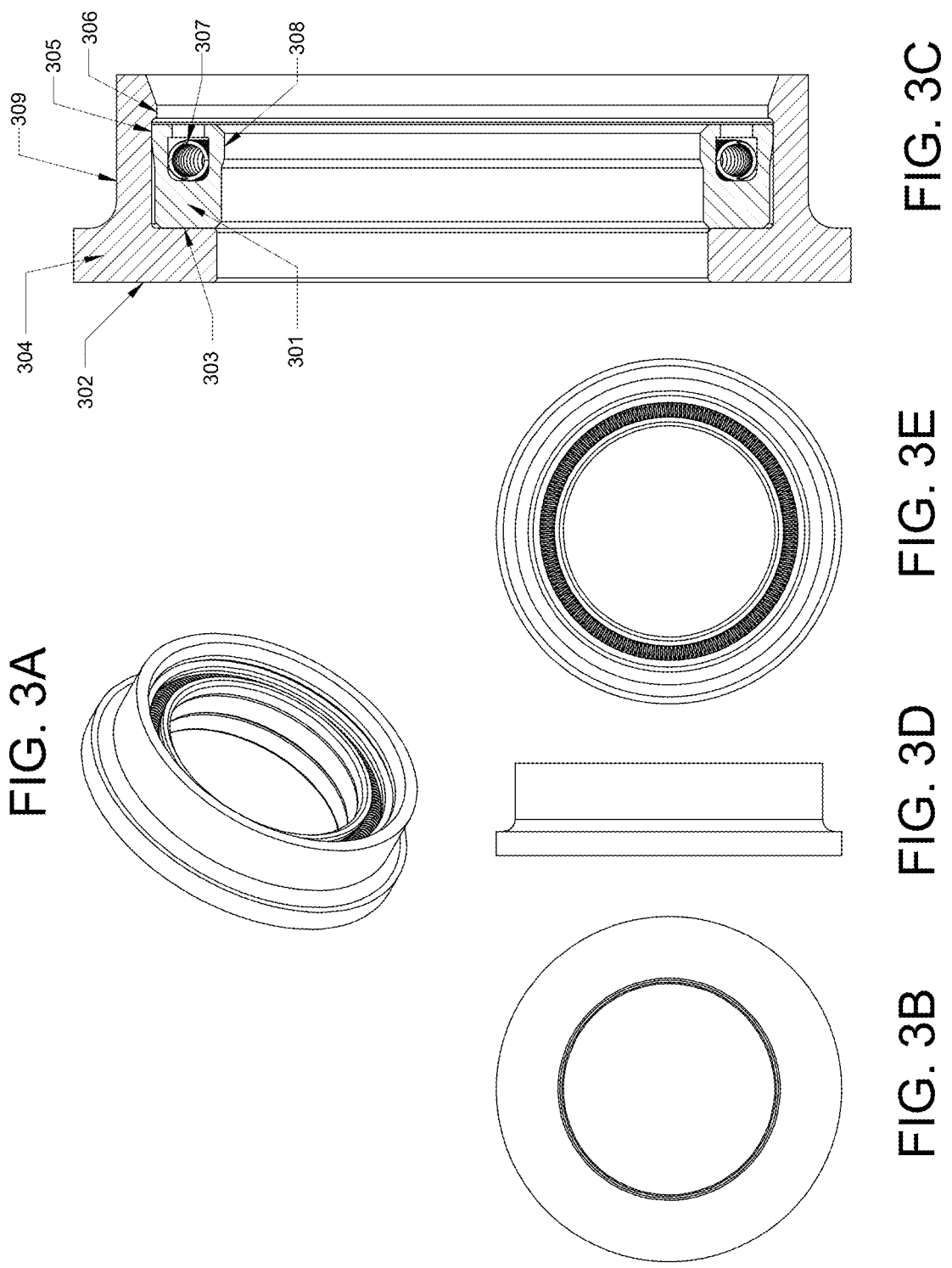
FIG. 3A illustrates a perspective view of a second embodiment.
FIG. 3B illustrates a rear view of the second embodiment.
FIG. 3C illustrates a left-side cross-section view of the second embodiment.
FIG. 3D illustrates a left-side view of the second embodiment.
FIG. 3E illustrates a front view of the second embodiment.

FIGS. 3A-3E depict a second example embodiment of a piston rod lip seal assembly. In particular, FIG. 3A illustrates a perspective view of a second example embodiment, FIG. 3B illustrates a rear view of the second example embodiment, FIG. 3C illustrates a left-side cross-section view of the second example embodiment, FIG. 3D illustrates a left-side view of the second example embodiment, and FIG. 3E illustrates a front view of the second example embodiment.

FIG. 3C illustrates the elements of an example embodiment of piston rod lip seal assembly 300 with separate seal carrier. Lip seal 301 may be disposed inside a separate seal carrier 304. Lip seal 301 may further include canted coil spring 307 (e.g., canted coil spring 1100, as illustrated in FIG. 11), which may be disposed between both inner circumferential sealing lip 308 and outer circumferential sealing lip 305. Lip seal 301 may be retained axially in seal carrier 304 by a protrusion in carrier 306, such that heel 303 of lip seal 301 is in face contact with seal carrier 304. Seal carrier 304 may have sealing face 302 that forms a seal with a housing component (not shown). Seal carrier 304 may also include a pilot diameter 309 for a wave spring.

Figures 4A, 4B, 4C, 4D, 4E:
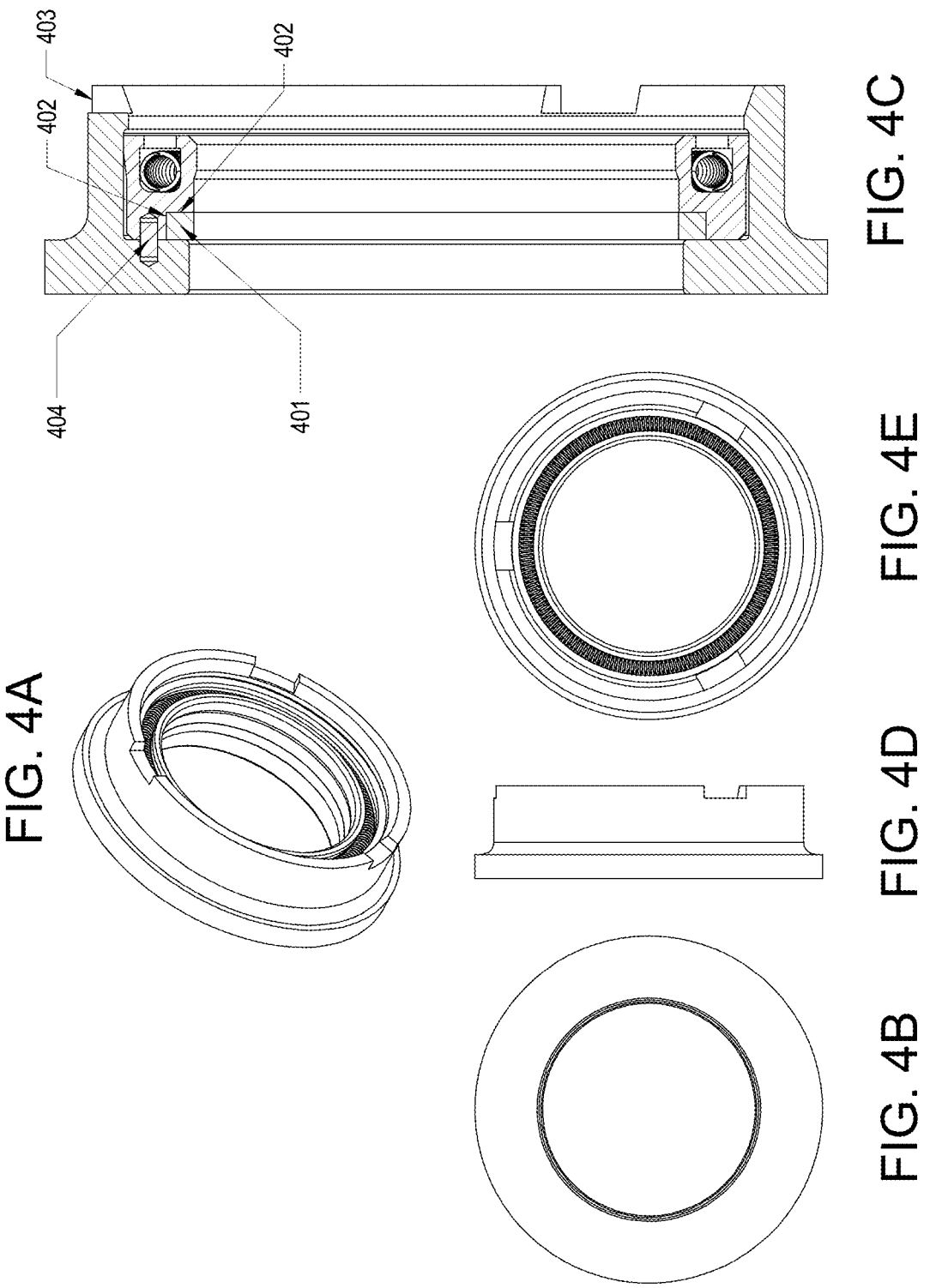
FIG. 4A illustrates a perspective view of a third embodiment.
FIG. 4B illustrates a rear view of the third embodiment.
FIG. 4C illustrates a left-side cross-section view of the third embodiment.
FIG. 4D illustrates a left-side view of the third embodiment.
FIG. 4E illustrates a front view of the third embodiment.

FIGS. 4A-4E depict variations of the second example embodiment shown in FIGS. 3A-3E with an anti-extrusion ring. Specifically, FIG. 4A illustrates a perspective view of a third example embodiment, FIG. 4B illustrates a rear view of the third example embodiment, FIG. 4C illustrates a left-side cross-section view of the third example embodiment, FIG. 4D illustrates a left-side view of the third example embodiment, and FIG. 4E illustrates a front view of the third example embodiment.

FIG. 4C illustrates piston rod lip seal assembly 400 with anti-extrusion ring 401 being disposed inside a notch in heel 402 of the lip seal. FIG. 4C further depicts peg 404 that may prevent relative rotation between the lip seal and the seal carrier, and a notch in the seal carrier 403 configured to vent gas to a cylinder.

Figure 5A:
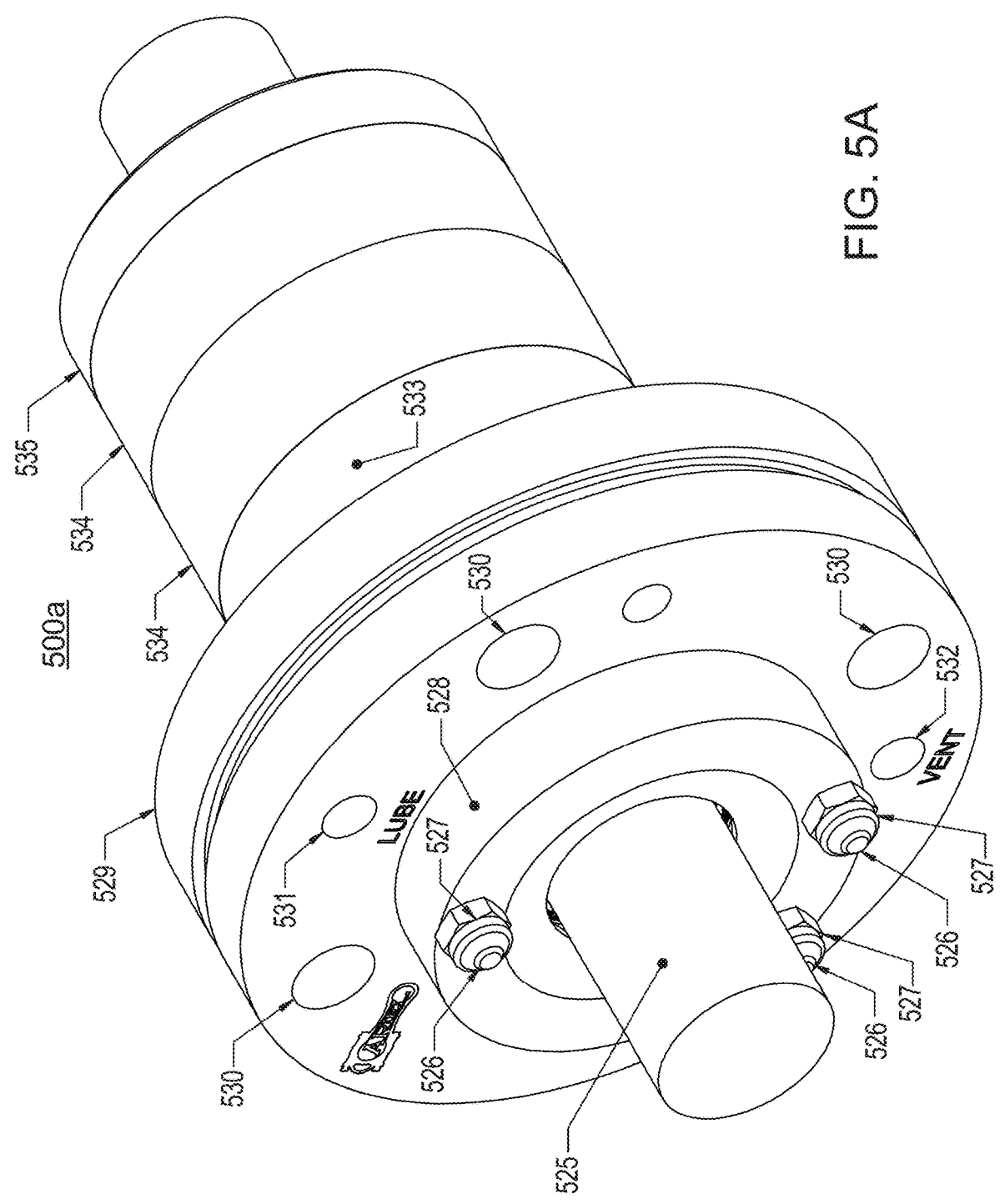
FIG. 5A illustrates a perspective view of a vented seal housing with attached oil seal according to certain example embodiments.

FIGS. 5A-5E illustrate an example vented seal housing with attached oil seal according to certain example embodiments. In particular, FIG. 5A illustrates a perspective view of an example vented seal housing 500a with attached oil seal showing a portion of the piston rod 525 as well as the lube connection 531, vent connection 532, and flange bolt holes 530. Threaded studs 526 and locknuts 527 hold oil seal cup 528, flange 529, oil cup 533, plain cups 534, and end cup 535, and vent plate 536 together as an assembly. Oil seal cup 528, flange 529, oil cup 533, plain cups 534, and end cup 535 are also depicted.

Figure 5B:
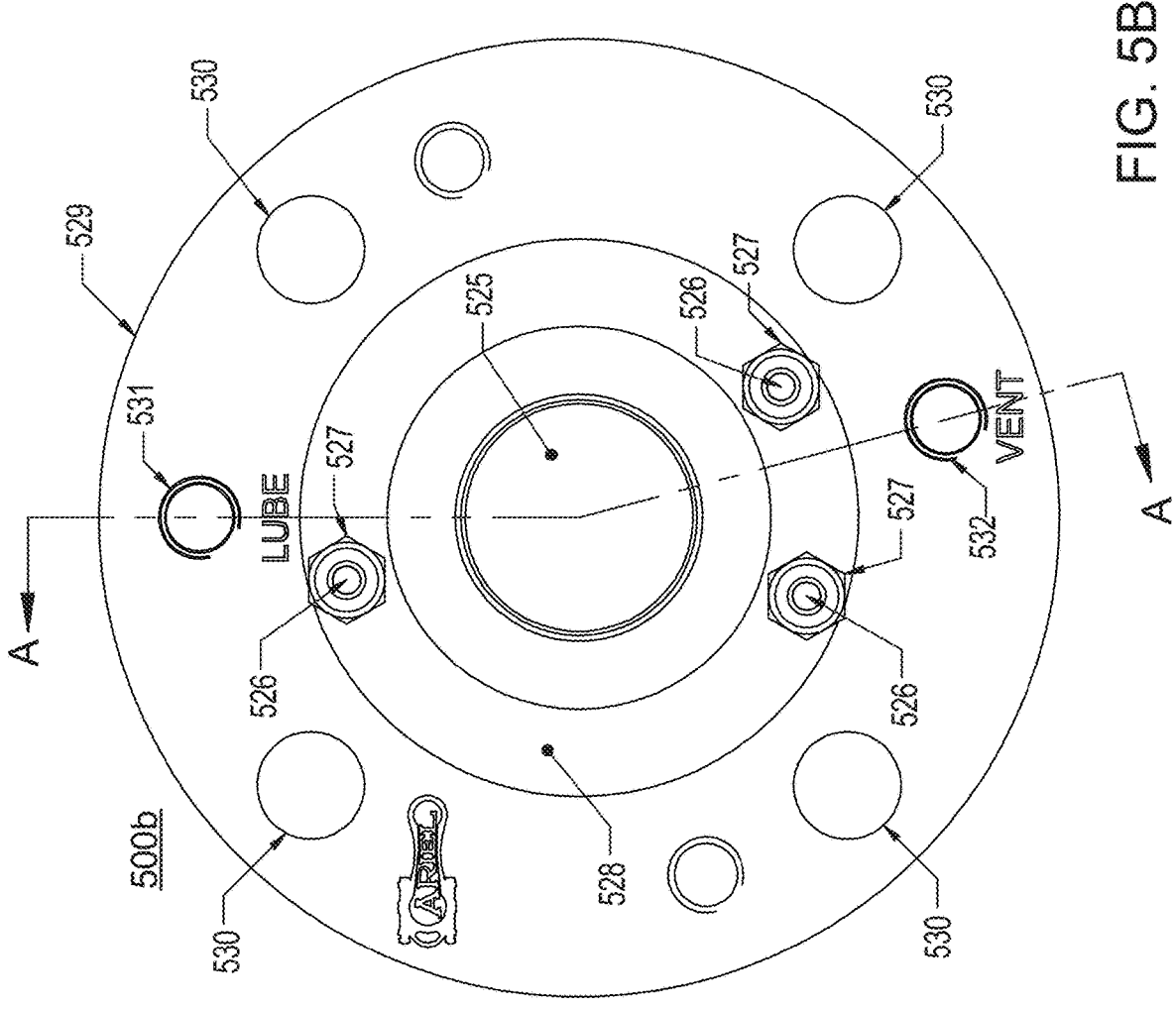
FIG. 5B illustrates a front view of a vented seal housing with attached oil seal according to some example embodiments.

FIG. 5B illustrates a front view of an example vented seal housing 500b with attached oil seal showing a portion of the piston rod 525, as well as the lube connection 531, vent connection 532, and flange bolt holes 530. Threaded studs 526 and locknuts 527 hold oil seal cup 528, flange 529, oil cup 533, plain cups 534, end cup 535, and vent plate 536 together as an assembly. Oil seal cup 528 and flange 529 are also depicted.

Figure 5C:
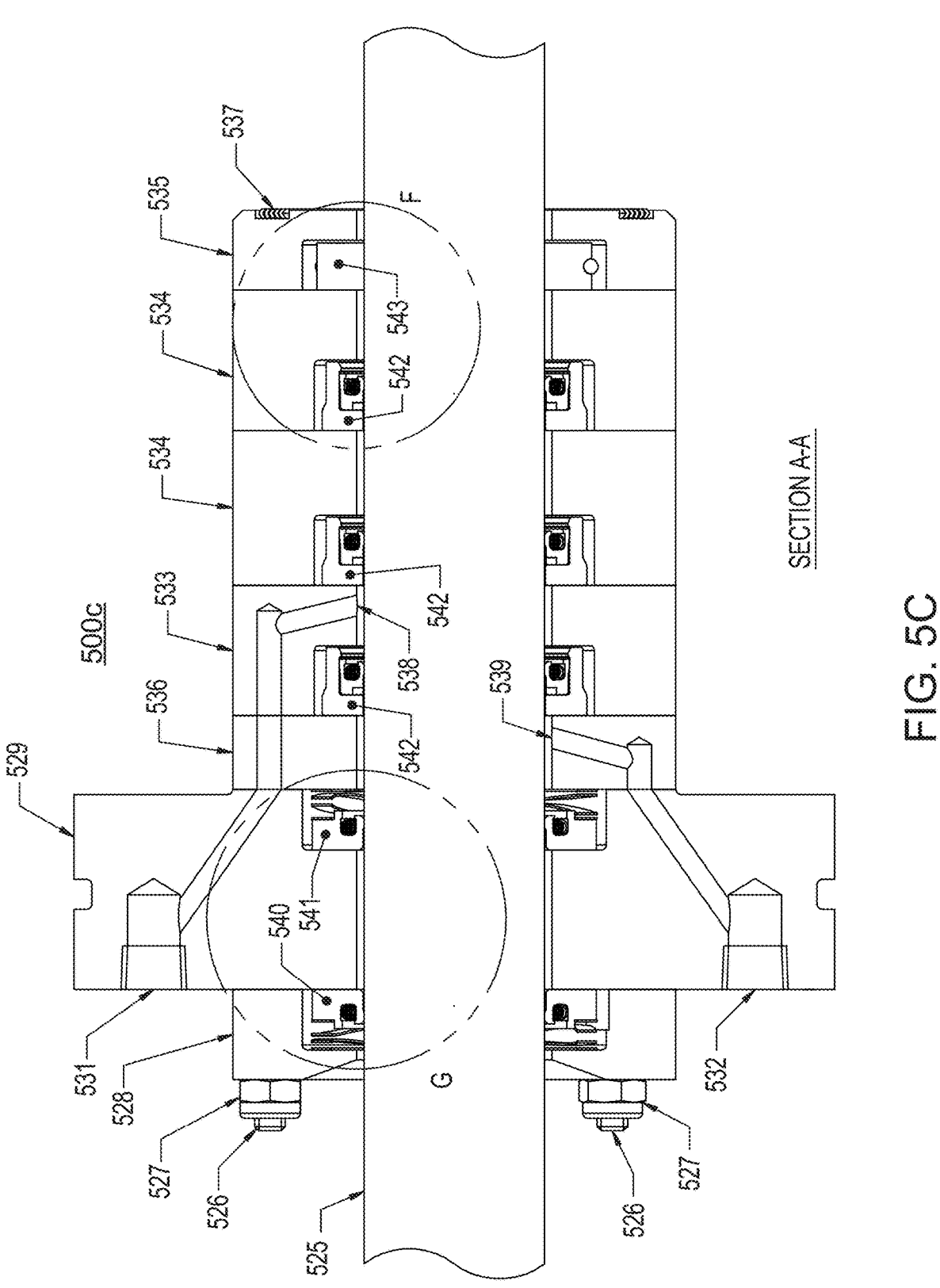
FIG. 5C illustrates a cross section of a vented seal housing with attached oil seal according to various example embodiments.

FIG. 5C illustrates the elements of an example vented seal housing 500c with attached oil seal. A portion of the piston rod 525 is shown. Threaded studs 526 may hold oil seal cup 528, flange 529, oil cup 533, plain cups 534, end cup 535, and vent plate 536 together with locknut 527. The attached oil seal cup 528 may optionally be configured with oil seal 540. The flange 529 may optionally be configured with a vent seal 541. Lube connection 531 on the flange allows for a fitting to be installed to deliver lubrication to the piston rod and seals. Vent connection 532 on the flange allows for a fitting to be installed connecting a vent tube to plumb any vent gas away for proper disposal. Vent plate 536 is machined with the vent opening 539. Oil cup 533 may house a last main seal with anti-extrusion ring 542 as well as the oil injection drilling 538 where the oil may be delivered to the piston rod and seals. Each of plain cups 534 may optionally be configured with a main seal with anti-extrusion ring 542. End cup 535 houses a pressure breaker 543 and has a gasket 537 fixed to the end face.

Figure 5E:
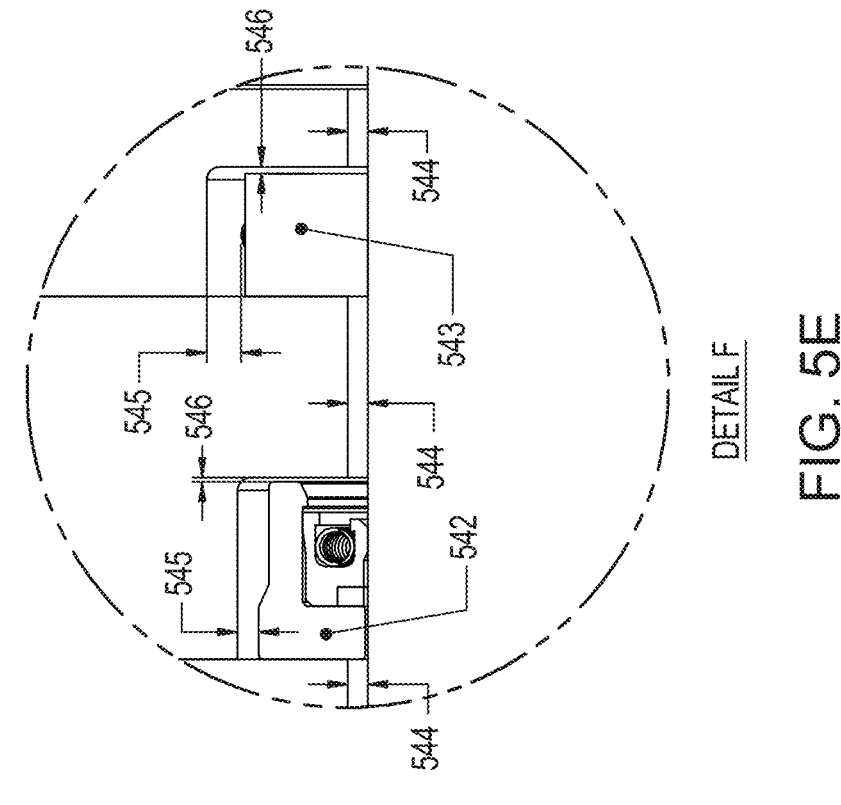
FIG. 5E illustrates a detail view of the main seal and the pressure breaker according to some example embodiments.
Figure 5D:
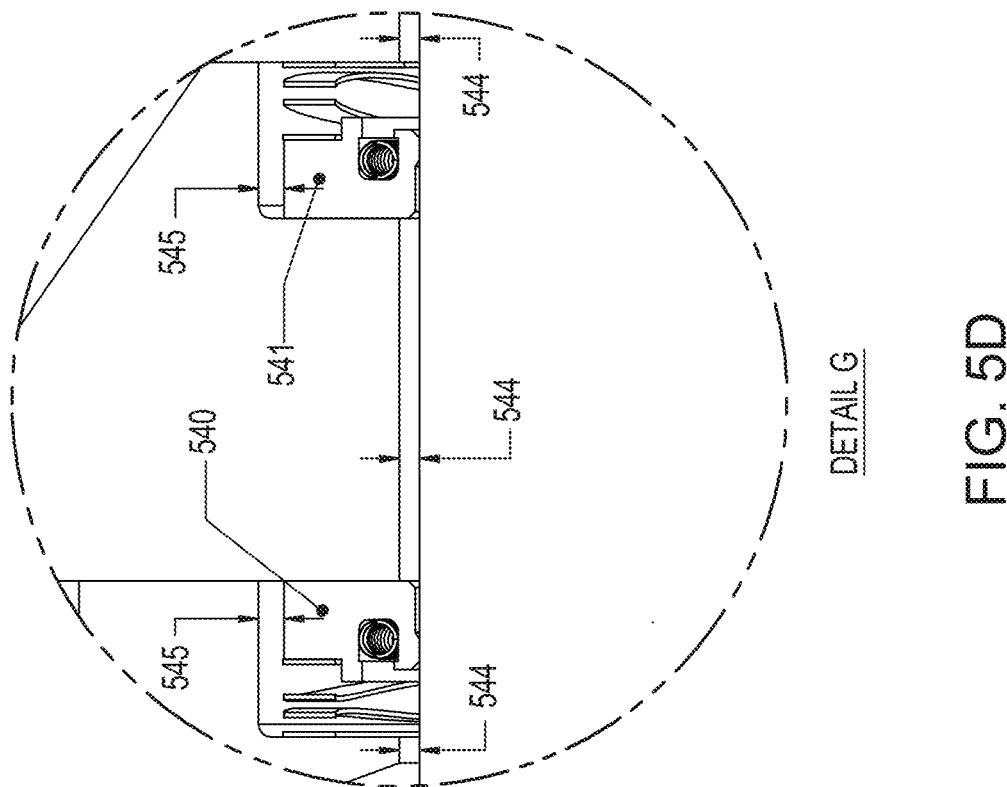
FIG. 5D illustrates a detail view of the oil seal and the vent seal according to certain example embodiments.

FIG. 5D illustrates a detail view of an embodiment configured as an oil seal 540 and an embodiment configured as a vent seal 541. Radial clearance between the piston rod outer diameter and cup inner diameter 544 may allow for lateral piston rod motion. Radial clearance between the seals outer diameter and the cup groove inner diameter 545 may allow for the seals to move with the lateral motion of the piston rod.

FIG. 5E illustrates a detail view of an embodiment configured as a main seal with anti-extrusion ring 542 as well as a pressure breaker 543. Axial side clearance 546 between the main seal 542 and pressure breaker 543 may prevent pinching in the cup groove from thermal expansion. Radial clearance between the piston rod outer diameter and cup inner diameter 544 may allow for lateral piston rod motion. Radial clearance between the seals outer diameter, and the cup groove inner diameter 545 may allow for the seals to move with the lateral motion of the piston rod.

Figure 6A:
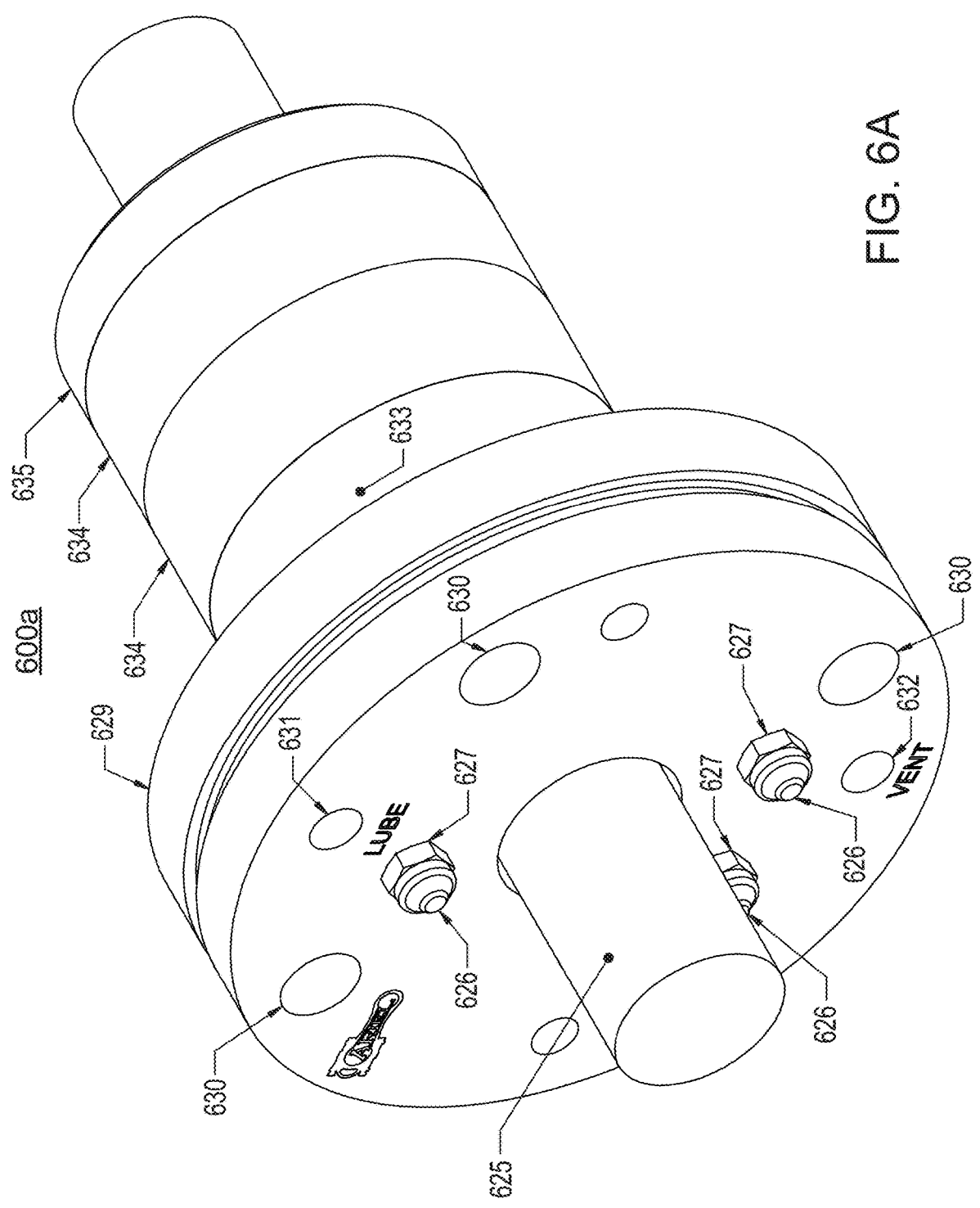
FIG. 6A illustrates a perspective view of a vented seal housing according to various example embodiments.
Figure 6B:
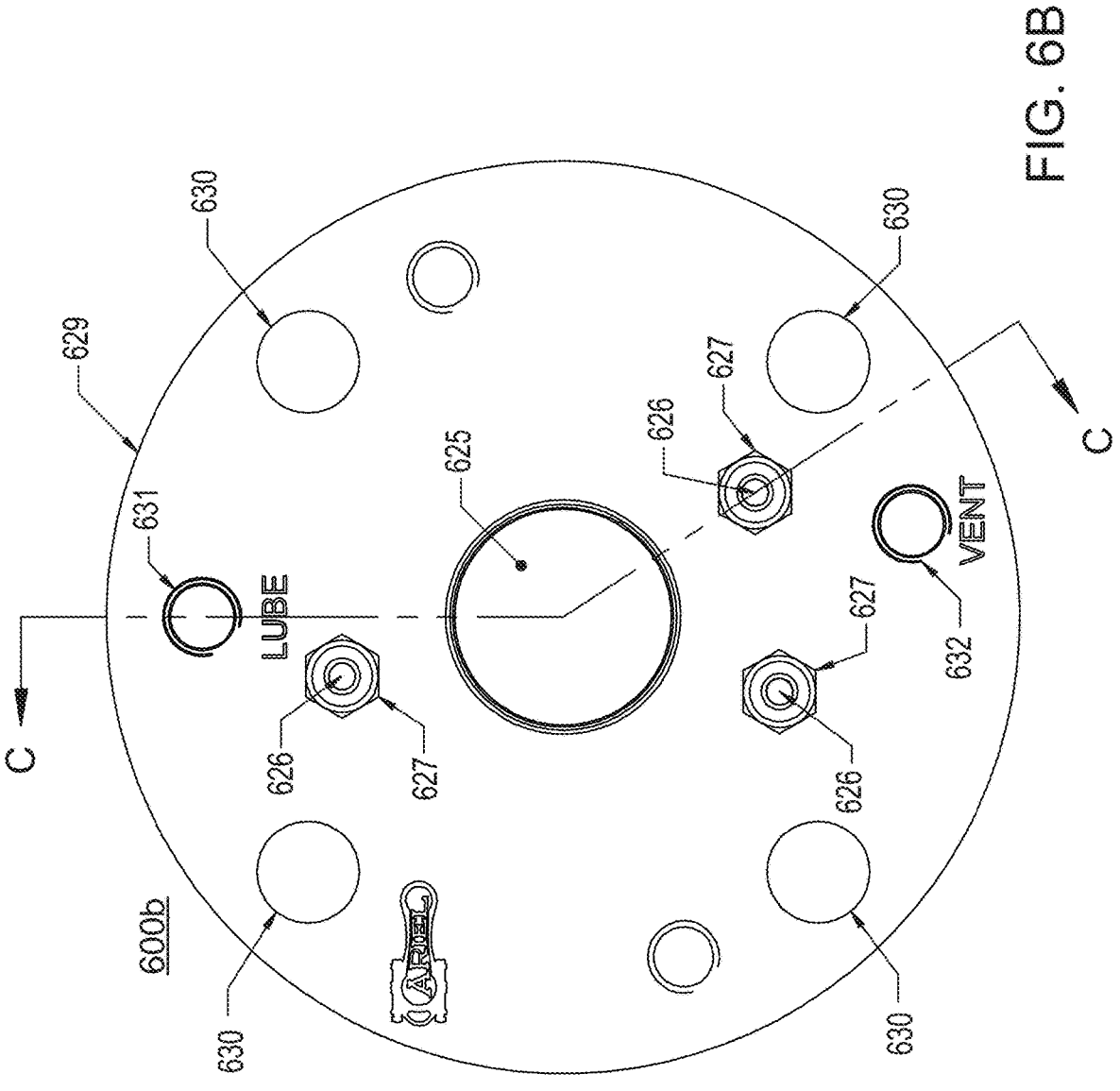
FIG. 6B illustrates a front view of a vented seal housing according to certain example embodiments.
Figure 6C:
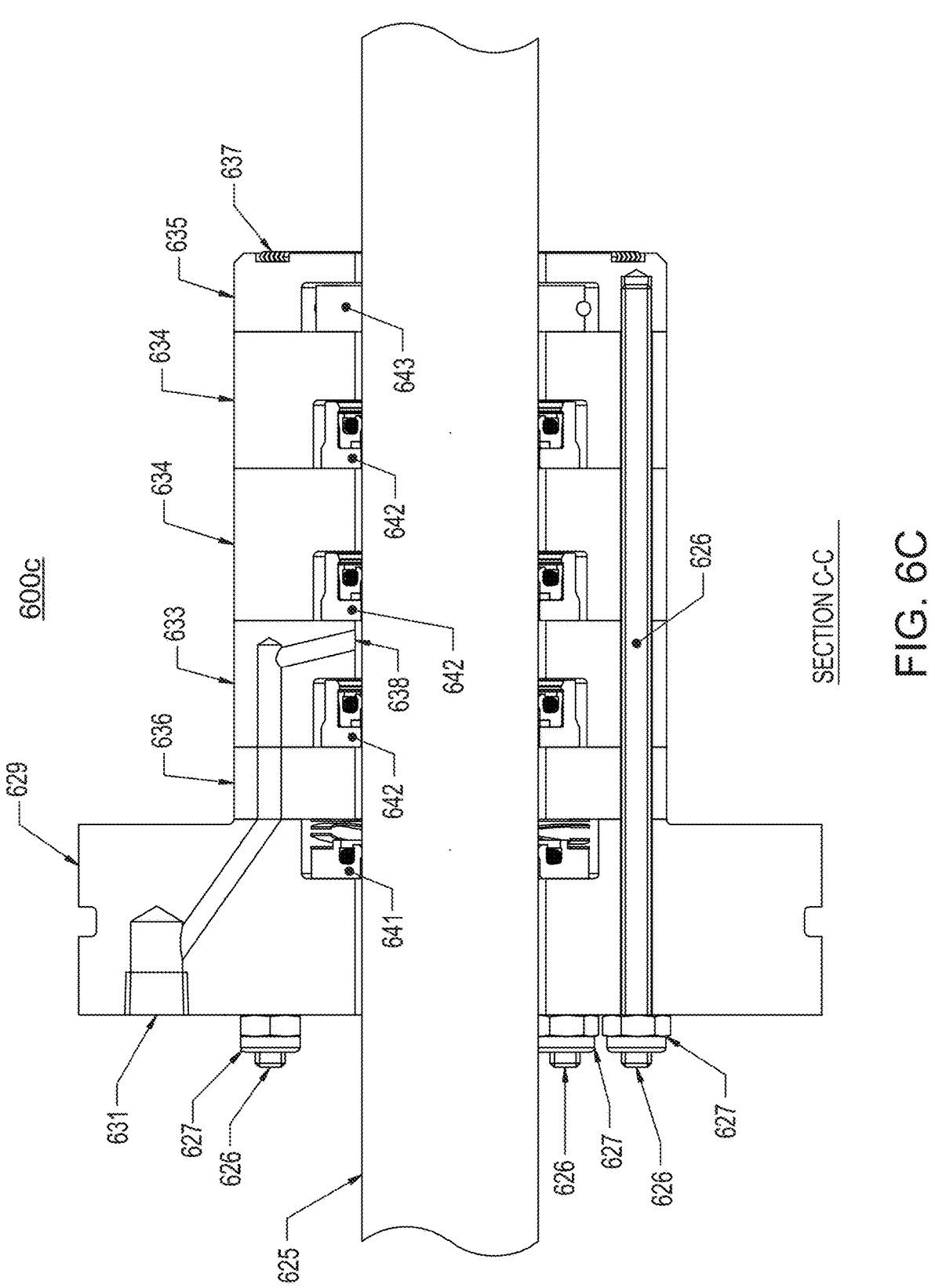
FIG. 6C illustrates a cross section of a vented seal housing according to some example embodiments.

FIGS. 6A-6C depict an example vented seal housing according to some example embodiments. In particular, FIG. 6A illustrates a perspective view of an example vented seal housing 600*a* showing a portion of the piston rod 625 as well as the lube connection 631, vent connection 632, and flange bolt holes 630. Threaded studs 626 and locknuts 627 hold the cups and flange together as an assembly. The flange 629, oil cup 633, plain cups 634 and end cup 635 are also depicted.

FIG. 6B illustrates a front view of an example vented seal housing 600*b* showing a portion of the piston rod 625 as well as the lube connection 631, vent connection 632, and flange bolt holes 630. Threaded studs 626 and locknuts 627 hold the cups and flange together as an assembly. The flange 629 is also depicted.

FIG. 6C illustrates the elements of an example vented seal housing 600*c*. A portion of the piston rod 625 is shown. Threaded studs 626 may hold all of the cups and flange together with locknuts 627. The flange 629 may optionally be configured with a vent seal 641. Lube connection 631 on the flange may allow for a fitting to be installed to deliver lubrication to the piston rod and seals. Vent plate 636 is also depicted. Oil cup 633 may optionally be configured with the last main seal with anti-extrusion ring 642 as well as the oil injection drilling 638 where the oil may be delivered to the piston rod and seals. Plain cups 634 may optionally be configured with a main seal with anti-extrusion ring 642. End cup 635 houses a pressure breaker 643 and has a gasket 637 fixed to the end face.

Figure 7A:
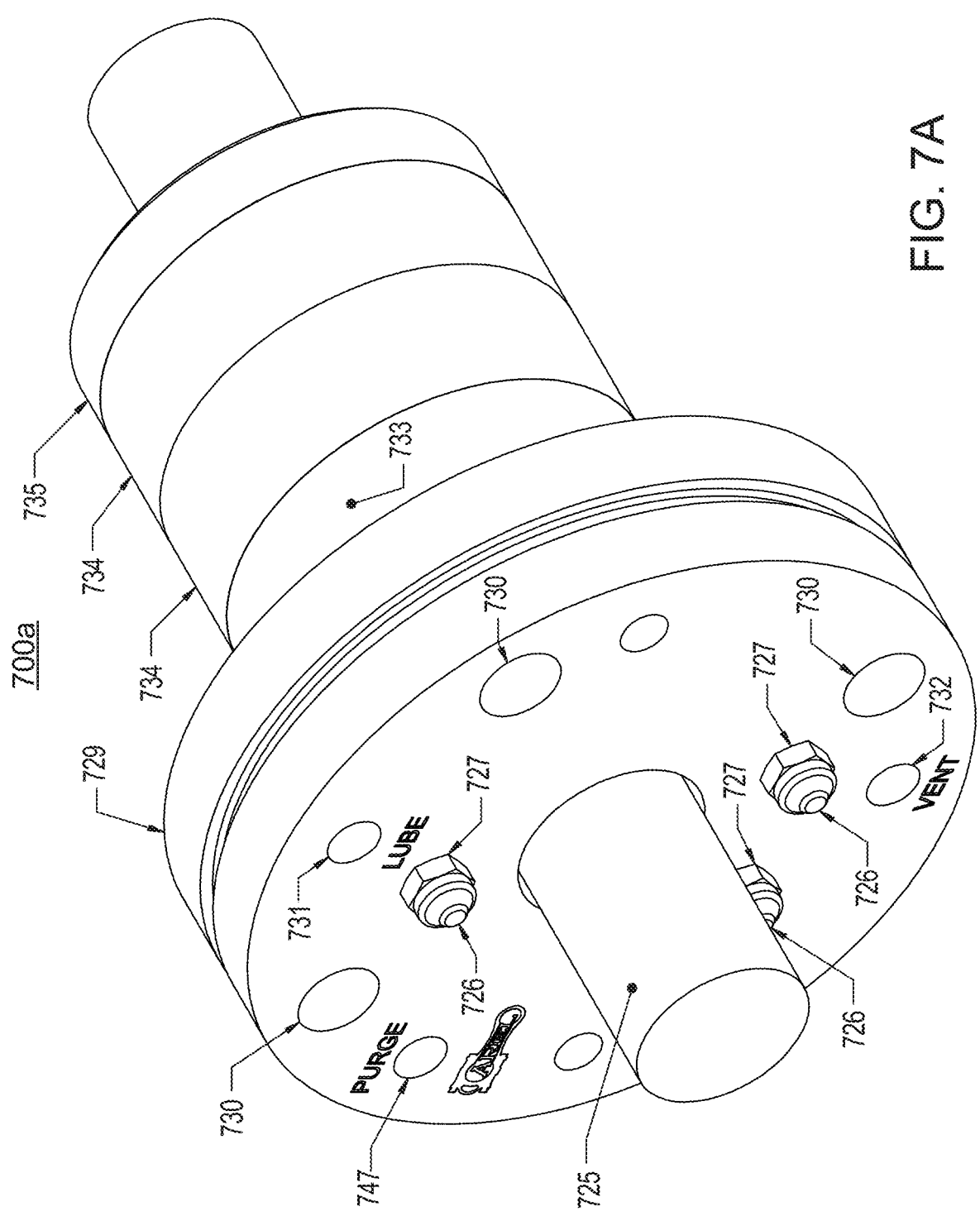
FIG. 7A illustrates a perspective view of a purged seal housing according to various example embodiments.

FIGS. 7A-7E depict an example purged seal housing according to various example embodiments. In particular, FIG. 7A illustrates a perspective view of an example purged seal housing seal 700*a* showing a portion of the piston rod 725 as well as the lube connection 731, vent connection 732, purge connection 747, and flange bolt holes 730. Threaded studs 726 and locknuts 727 hold the cups and flange together as an assembly. The flange 729, oil cup 733, plain cups 734 and end cup 735 are also depicted.

Figure 7B:
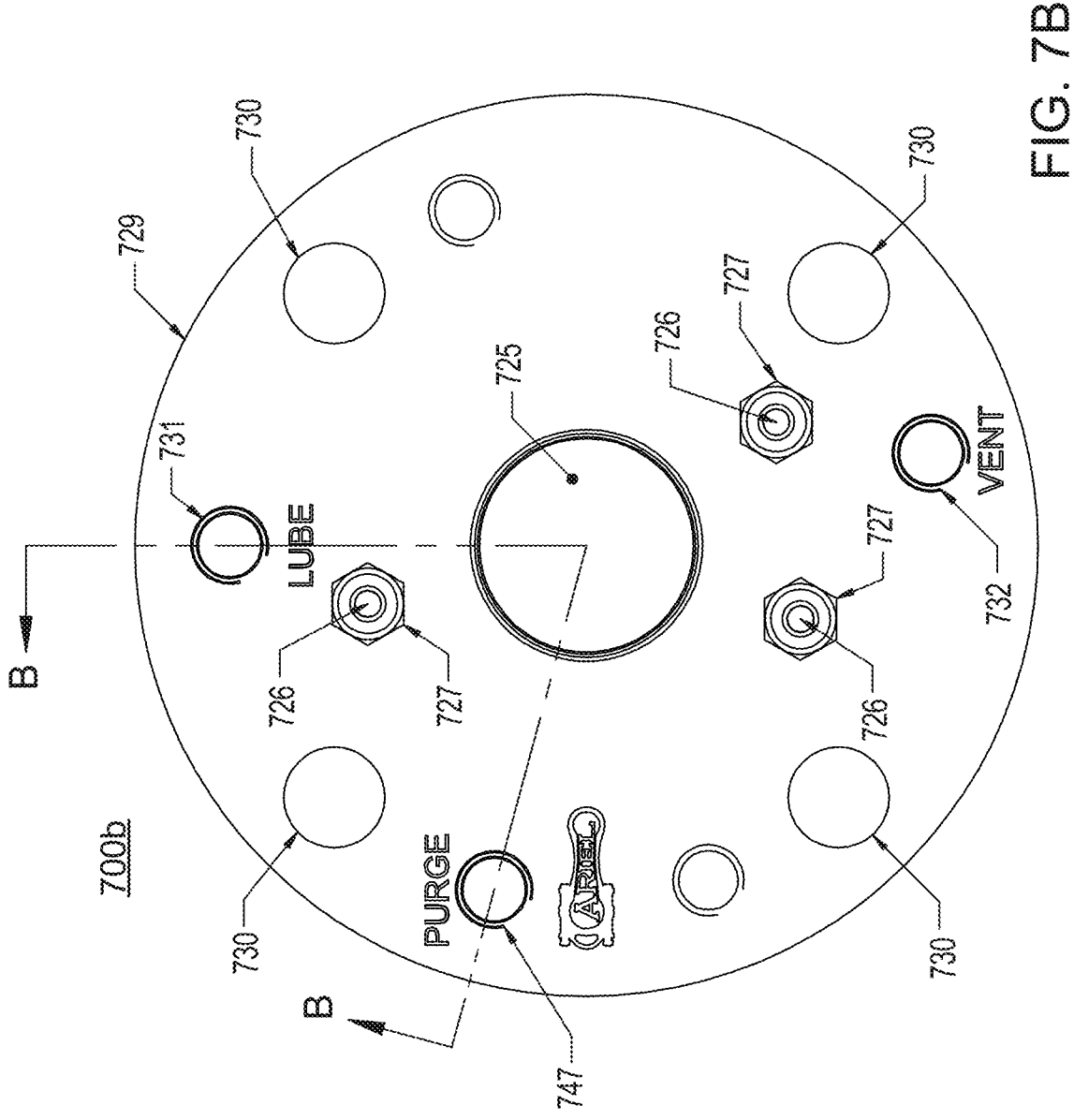
FIG. 7B illustrates a front view of a purged seal housing according to certain example embodiments.

FIG. 7B illustrates a front view of an example purged seal housing 700*b* showing a portion of the piston rod 725 as well as the lube connection 731, vent connection 732, purge connection 747, and flange bolt holes 730. Threaded studs 726 and locknuts 727 hold the cups and flange together as an assembly. The flange 729 is also depicted.

Figure 7C:
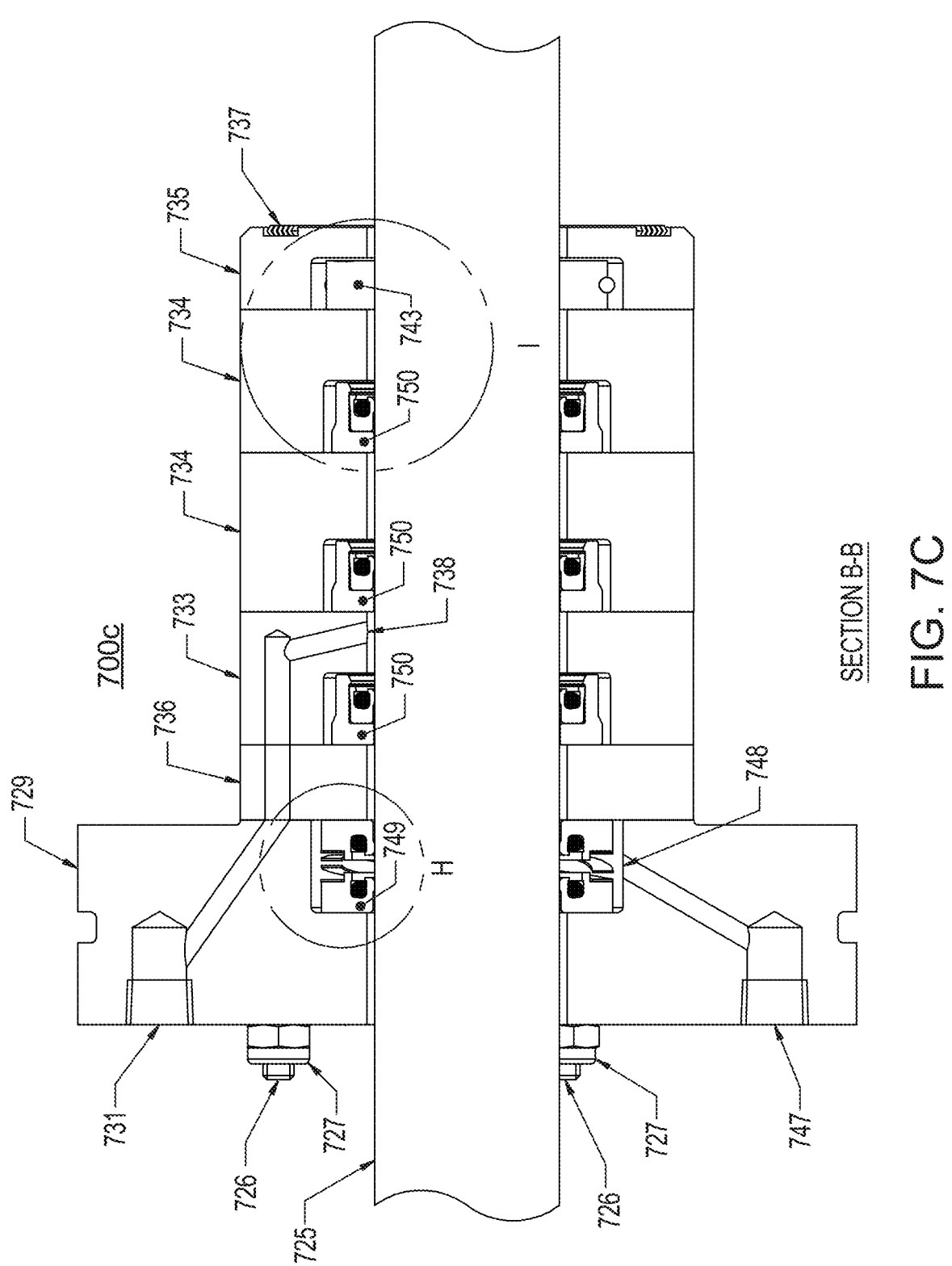
FIG. 7C illustrates a cross section of a purged seal housing according to some example embodiments.

FIG. 7C illustrates the elements of an example purged seal housing 700*c*. A portion of the piston rod 725 is shown. Threaded studs 726 holds all of the cups and flange together with locknut 727. The flange 729 may optionally be configured with a purge seal 749. Lube connection 731 on the flange allows for a fitting to be installed to deliver lubrication to the piston rod and seals. Purge connection 747 on the flange allows for a fitting to be installed to supply purge gas to the purge seal via the purge gas opening 748. Vent plate 736 is also depicted. Oil cup 733 may optionally be configured with the last main seal (no anti-extrusion ring) 750 as well as the oil injection drilling 738 where the oil is delivered to the piston rod and seals. Each of plain cups 734 may optionally be configured with a main seal (no anti-extrusion ring) 750. End cup 735 houses a pressure breaker 743 and has a gasket 737 fixed to the end face.

Figures 7D, 7E:
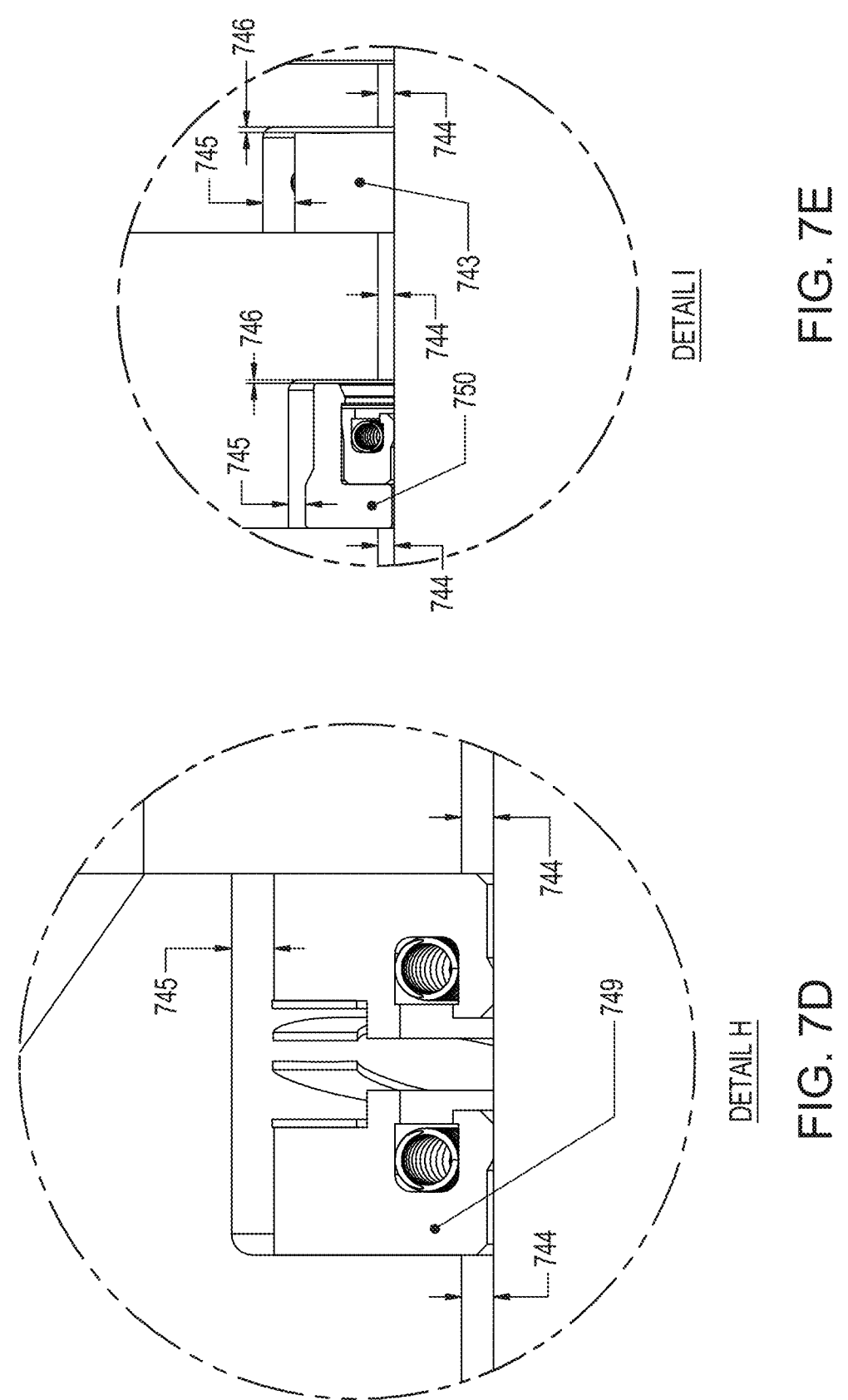
FIG. 7D illustrates a detail view of the purge seal according to various example embodiments.
FIG. 7E illustrates a detail view of the main seal and the pressure breaker according to certain example embodiments.

FIG. 7D illustrates a detail view of an embodiment configured as a purge seal 749. Radial clearance between the piston rod outer diameter, and cup inner diameter 744 may allow for lateral piston rod motion. Radial clearance between the seals outer diameter, and the cup groove inner diameter 745 may allow for the seals to move with the lateral motion of the piston rod.

FIG. 7E illustrates a detail view of an embodiment configured as a main seal (no anti-extrusion ring) 750 as well as a pressure breaker 743. Axial side clearance 746 between the main seal 750 and pressure breaker 743 may prevent pinching in the cup groove from thermal expansion. Radial clearance between the piston rod outer diameter, and cup inner diameter 744 may allow for lateral piston rod motion. Radial clearance between the seals outer diameter, and the cup groove inner diameter 745 may allow for the seals to move with the lateral motion of the piston rod.

Figure 8A:
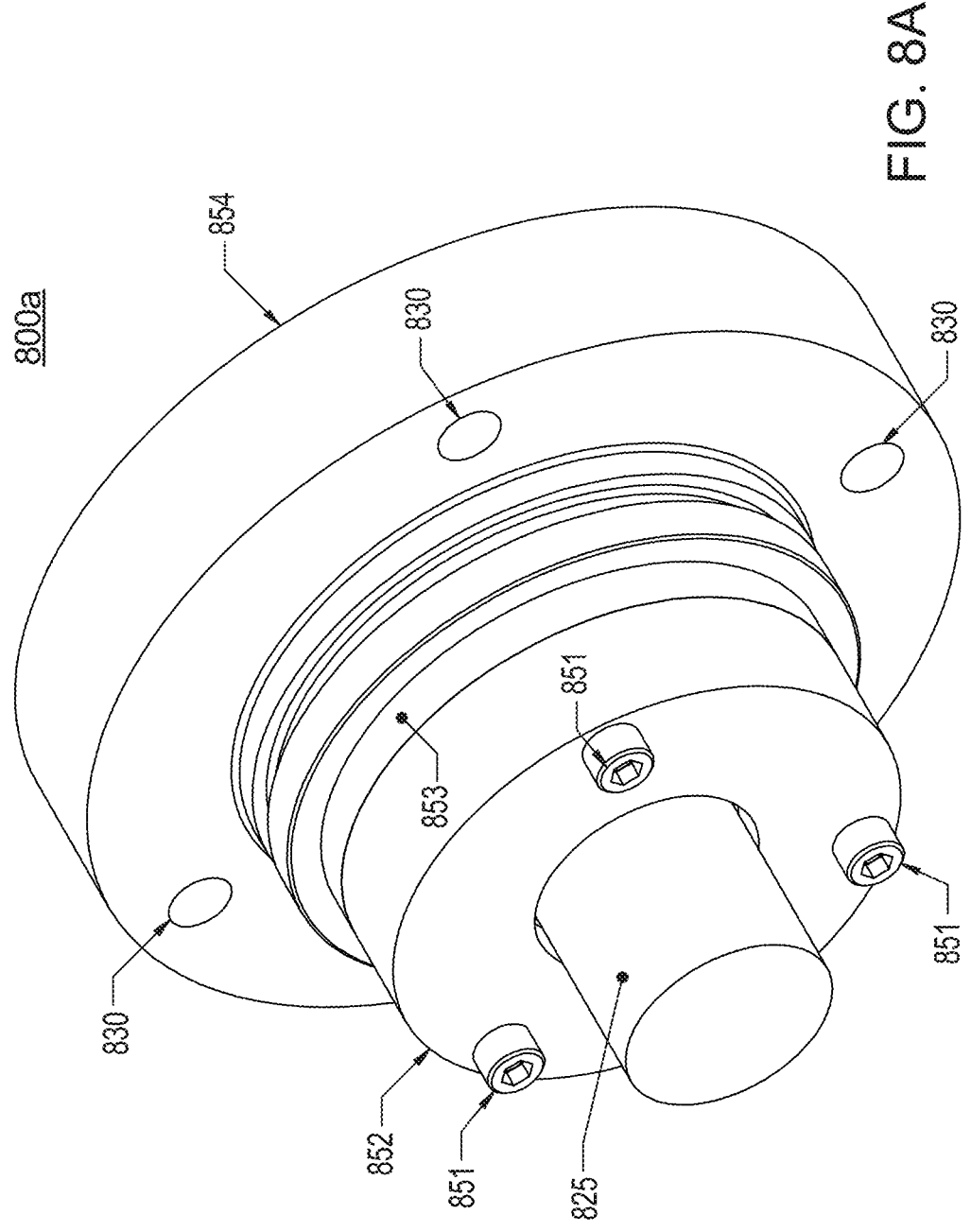
FIG. 8A illustrates a perspective view of a separate oil seal housing with vent seal according to some example embodiments.

FIGS. 8A-8D depict an example oil seal housing with attached vent seal according to certain example embodiments. In particular, FIG. 8A illustrates a perspective view of an example oil seal housing 800*a* with attached vent seal showing a portion of the piston rod 825, as well as the oil seal cup 852, plate 853, gland 854, and bolt holes 830. Cap screws 851 secure the oil seal cup and plate to the gland as an assembly.

Figure 8B:
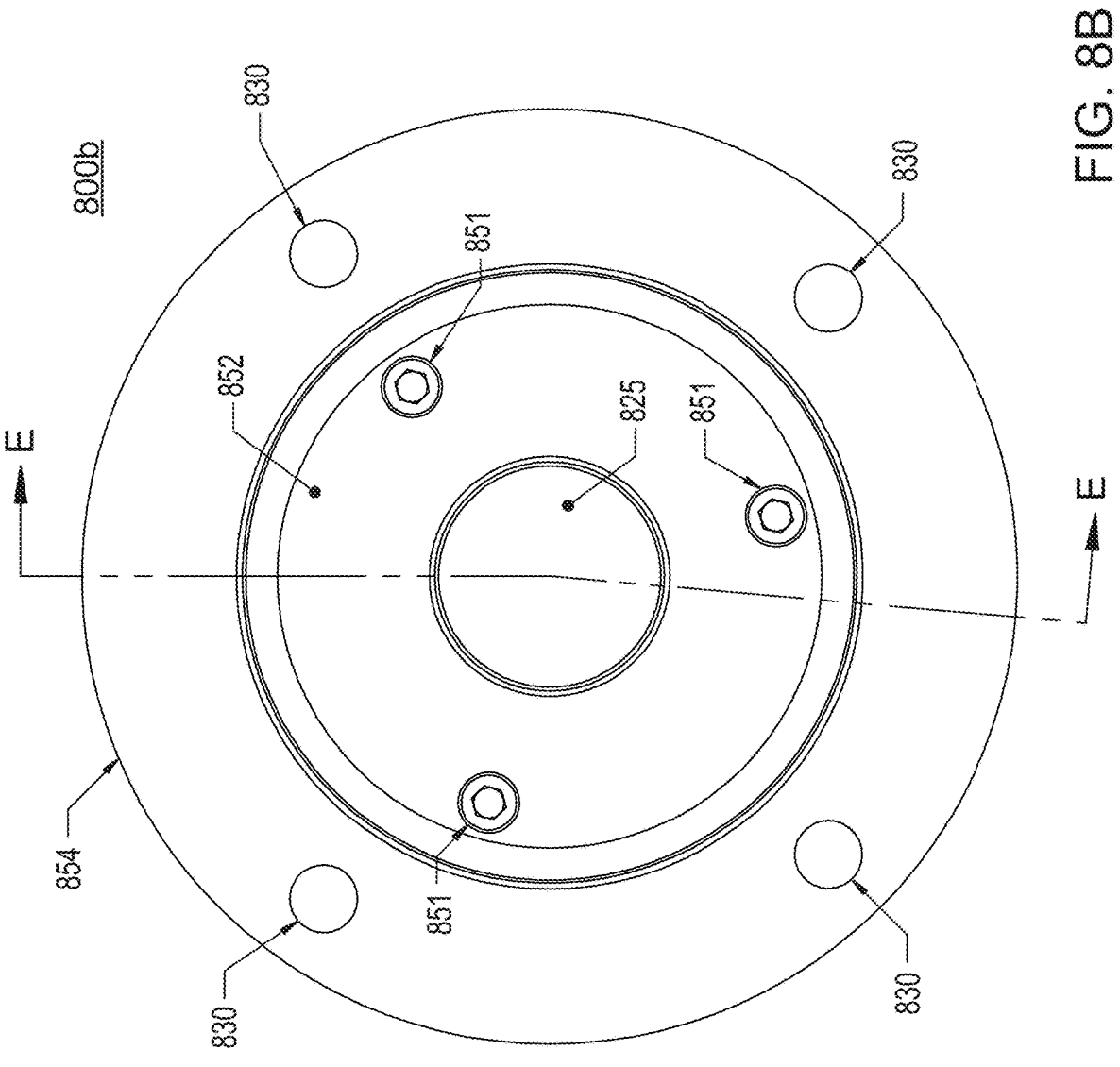
FIG. 8B illustrates a front view of a separate oil seal housing with vent seal according to various example embodiments.

FIG. 8B illustrates a front view of an example oil seal housing 800*b* with attached vent seal showing a portion of the piston rod 825, as well as the oil seal cup 852, gland 854 and bolt holes 830. Cap screws 851 secure the oil seal cup and plate to the gland as an assembly.

Figure 8C:
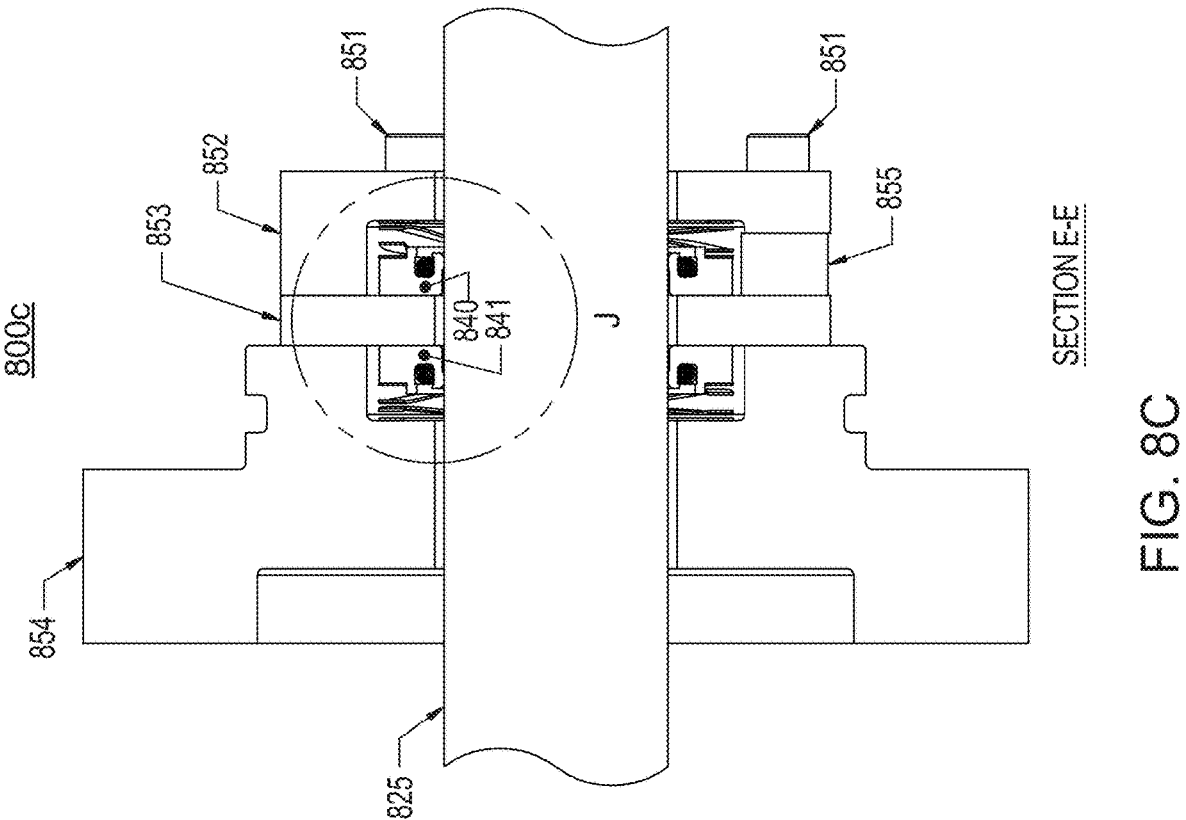
FIG. 8C illustrates a cross section of a separate oil seal housing with vent seal according to certain example embodiments.

FIG. 8C illustrates the elements of an example oil seal housing 800*c* with attached vent seal. A portion of the piston rod 825 is shown. Cap screws 851 secure the oil seal cup 852 and plate 853 to the gland 854. The oil seal cup 852 has an oil drain passage 855 to return crankcase oil to the crankcase. An embodiment configured as an oil seal 840 is housed in the oil cup 852. An embodiment configured as a vent seal 841 is housed in the gland 854.

Figure 8D:
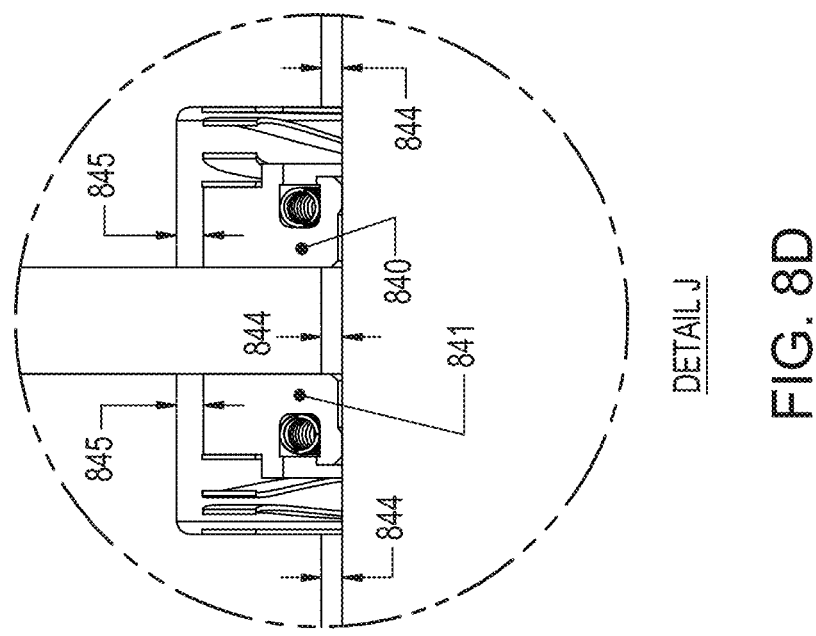
FIG. 8D illustrates a detail view of the vent seal and oil seal according to some example embodiments.

FIG. 8D illustrates a detail view of an embodiment configured as an oil seal 840 and of an embodiment configured as a vent seal 841. Radial clearance between the piston rod outer diameter, and cup inner diameter 844 may allow for lateral piston rod motion. Radial clearance between the seals outer diameter, and the cup groove inner diameter 845 may allow for the seals to move with the lateral motion of the piston rod.

Figure 9A:
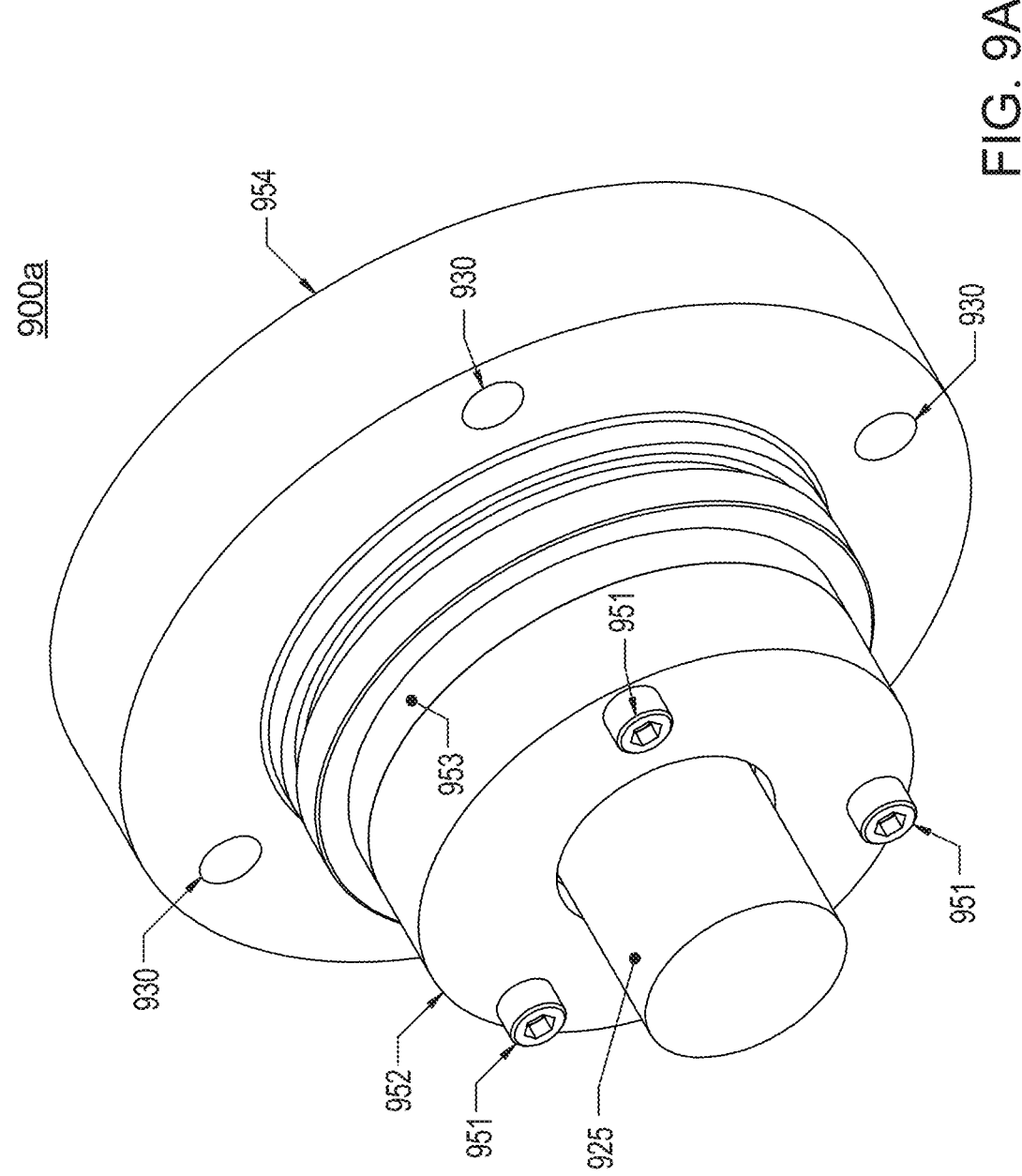
FIG. 9A illustrates a perspective view of a separate oil seal housing with purge seal according to various example embodiments.

FIGS. 9A-9D depict an example oil seal housing 900*a* with attached purge seal according to some example embodiments. In particular, FIG. 9A illustrates a perspective view of an example oil seal housing with attached purge seal showing a portion of the piston rod 925, as well as the oil seal cup 952, plate 953, gland 954, and bolt holes 930. Cap screws 951 secure the oil seal cup and plate to the gland as an assembly.

Figure 9B:
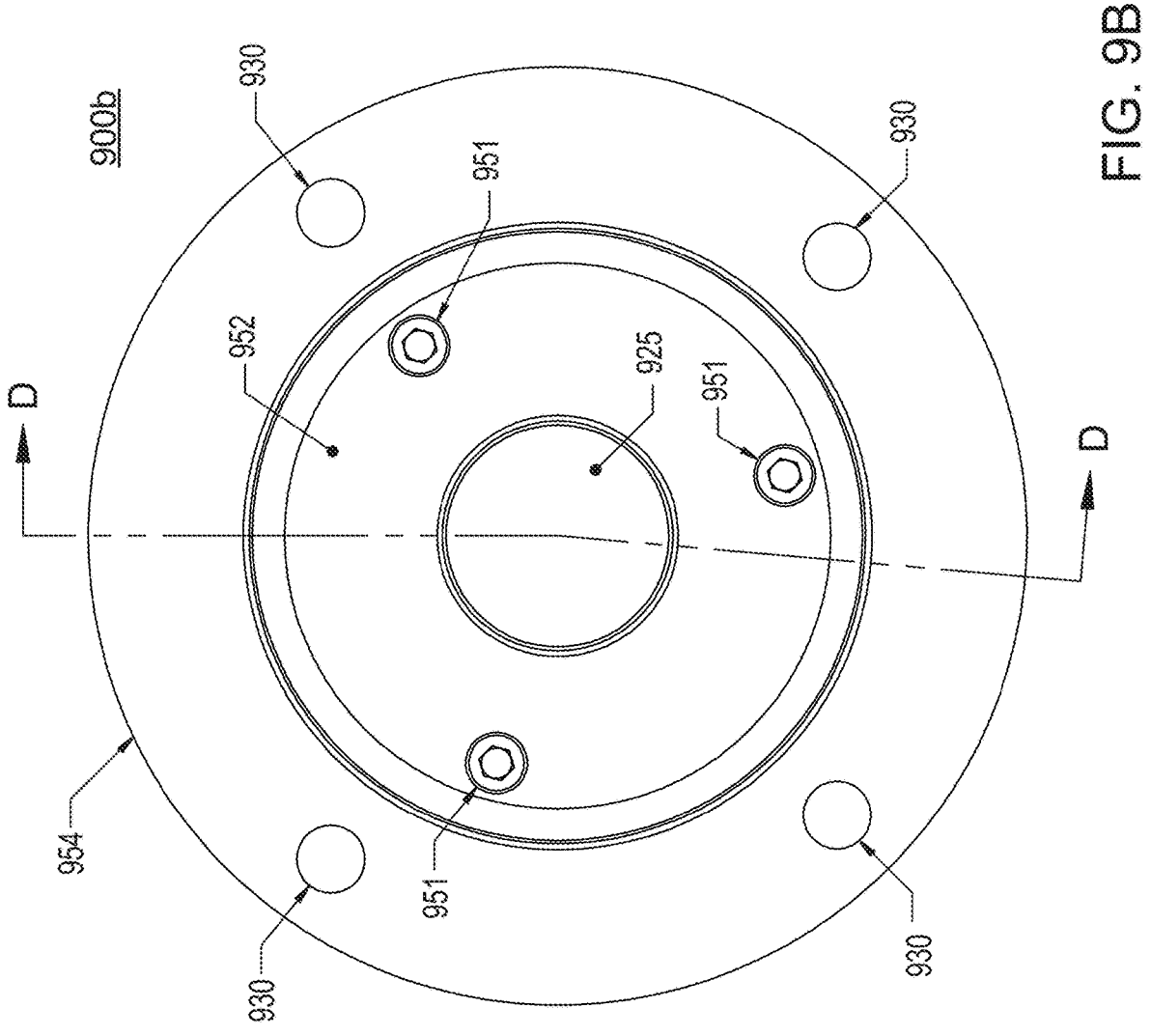
FIG. 9B illustrates a front view of a separate oil seal housing with purge seal according to certain example embodiments.

FIG. 9B illustrates a front view of an example oil seal housing 900*b* with attached purge seal showing a portion of the piston rod 925, as well as the oil seal cup 952, gland 954 and bolt holes 930. Cap screws 951 secure the oil seal cup and plate to the gland as an assembly.

Figure 9D:
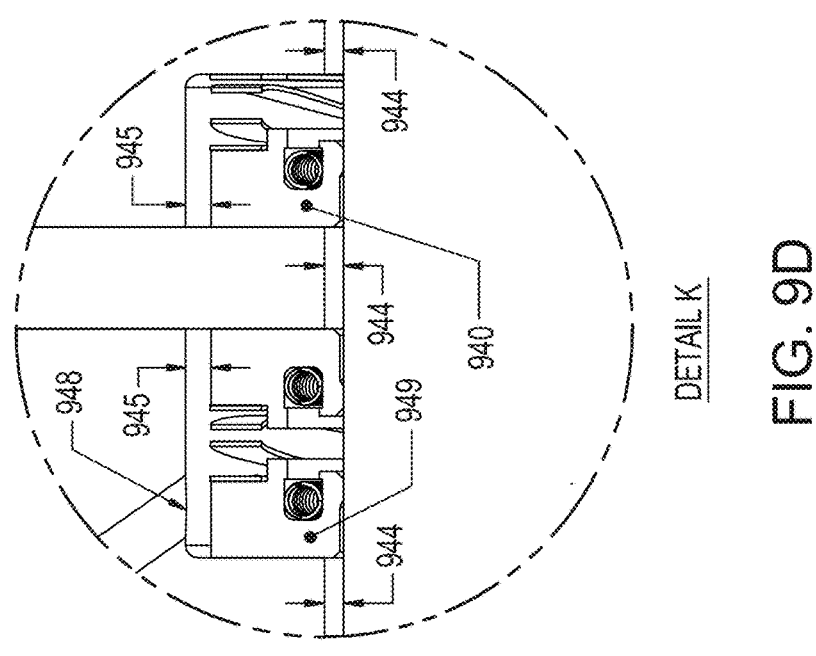
FIG. 9D illustrates a detail view of the purge seal and oil seal according to various example embodiments.
Figure 9C:
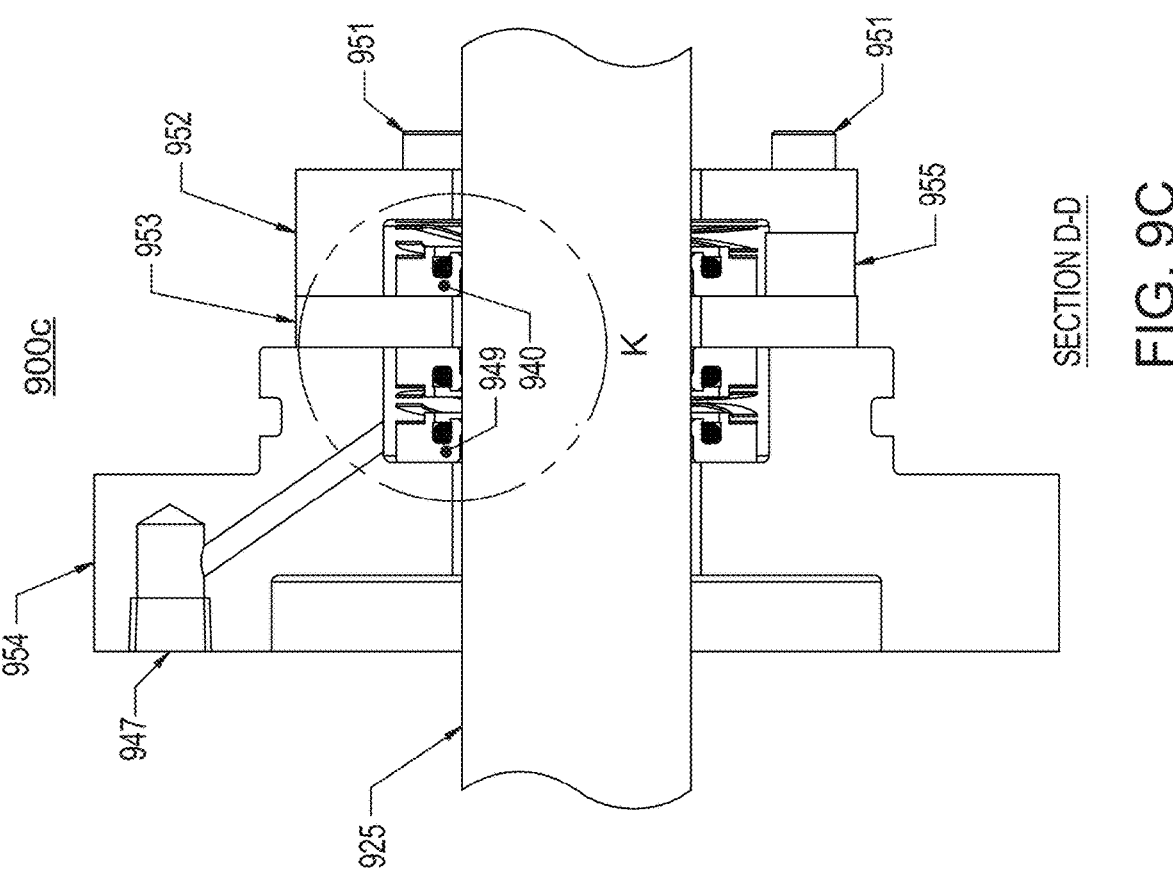
FIG. 9C illustrates a cross section of a separate oil seal housing with purge seal according to some example embodiments.

FIG. 9C illustrates the elements of an example oil seal housing 900*c* with attached purge seal. A portion of the piston rod 925 is shown. Cap screws 951 secure the oil seal cup 952 and plate 953 to the gland 954. The oil seal cup 952 has an oil drain passage 955 to return crankcase oil to the crankcase. An embodiment configured as an oil seal 940 is housed in the oil seal cup 952. An embodiment configured as a purge seal 949 is housed in the gland 954. A purge connection 947 on the gland allows for a fitting to be installed to supply purge gas to the purge seal.

FIG. 9D illustrates a detail view of an embodiment configured as an oil seal 940 and of an embodiment configured as a purge seal 949. The purge gas opening 948 allows purge gas to flow to the purge seal. Radial clearance between the piston rod outer diameter, and cup inner diameter 944 may allow for lateral piston rod motion. Radial clearance between the seals outer diameter, and the cup groove inner diameter 945 may allow for the seals to move with the lateral motion of the piston rod.

Figure 10A:
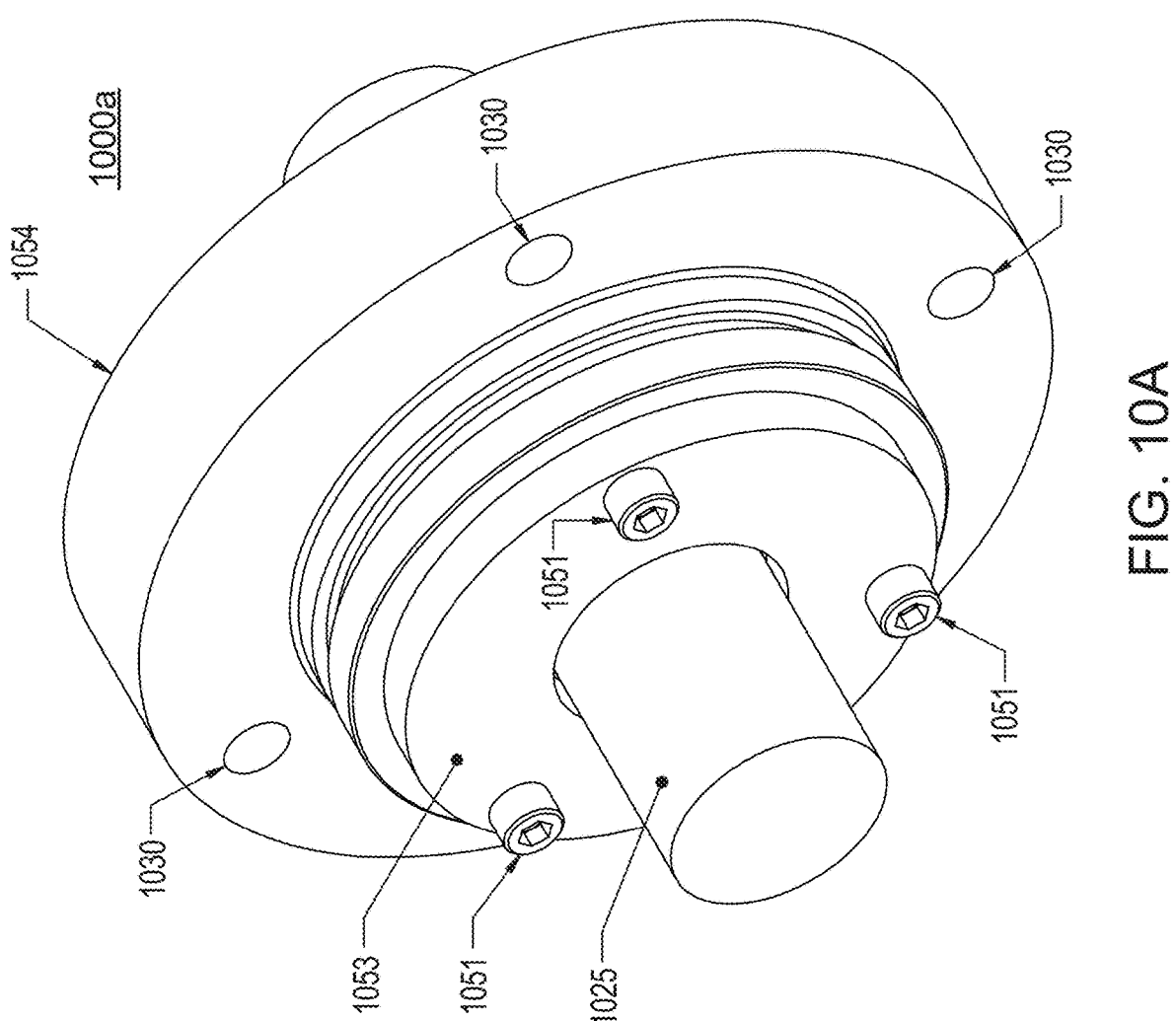
FIG. 10A illustrates a perspective view of an intermediate purge seal housing according to certain example embodiments.

FIGS. 10A-10D depict an example intermediate purge seal housing according to various example embodiments. In particular, FIG. 10A illustrates a perspective view of an example intermediate purge seal housing 1000a showing a portion of the piston rod 1025, as well as the plate 1053, gland 1054, and bolt holes 1030. Cap screws 1051 secure the plate to the gland as an assembly.

Figure 10B:
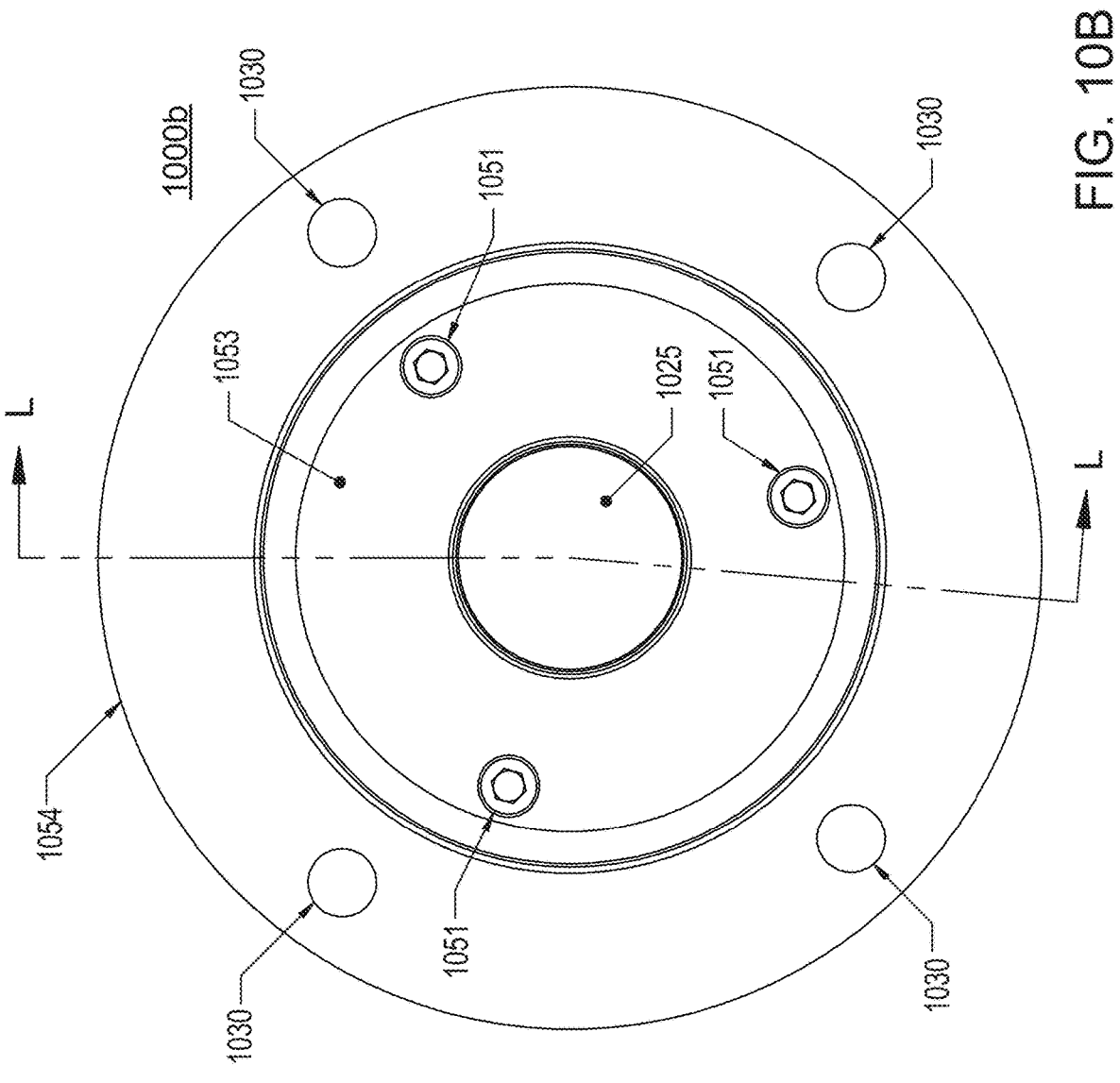
FIG. 10B illustrates a front view of an intermediate purge seal housing according to some example embodiments.

FIG. 10B illustrates a front view of an example intermediate purge seal housing 1000b showing a portion of the piston rod 1025, as well as the plate 1053, gland 1054 and bolt holes 1030. Cap screws 1051 secure the plate to the gland as an assembly.

Figure 10D:
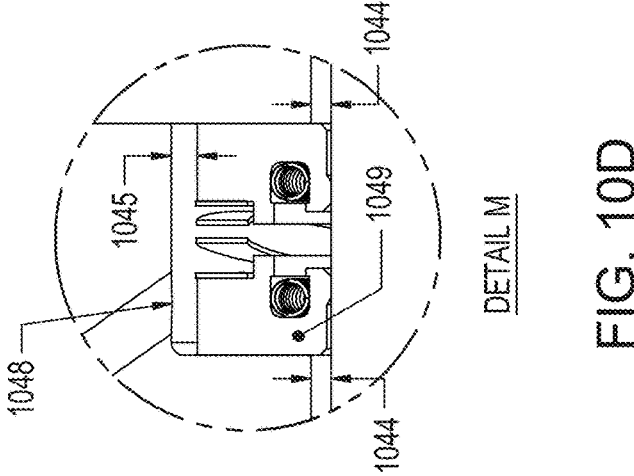
FIG. 10D illustrates a detail view of the purge seal according to certain example embodiments.
Figure 10C:
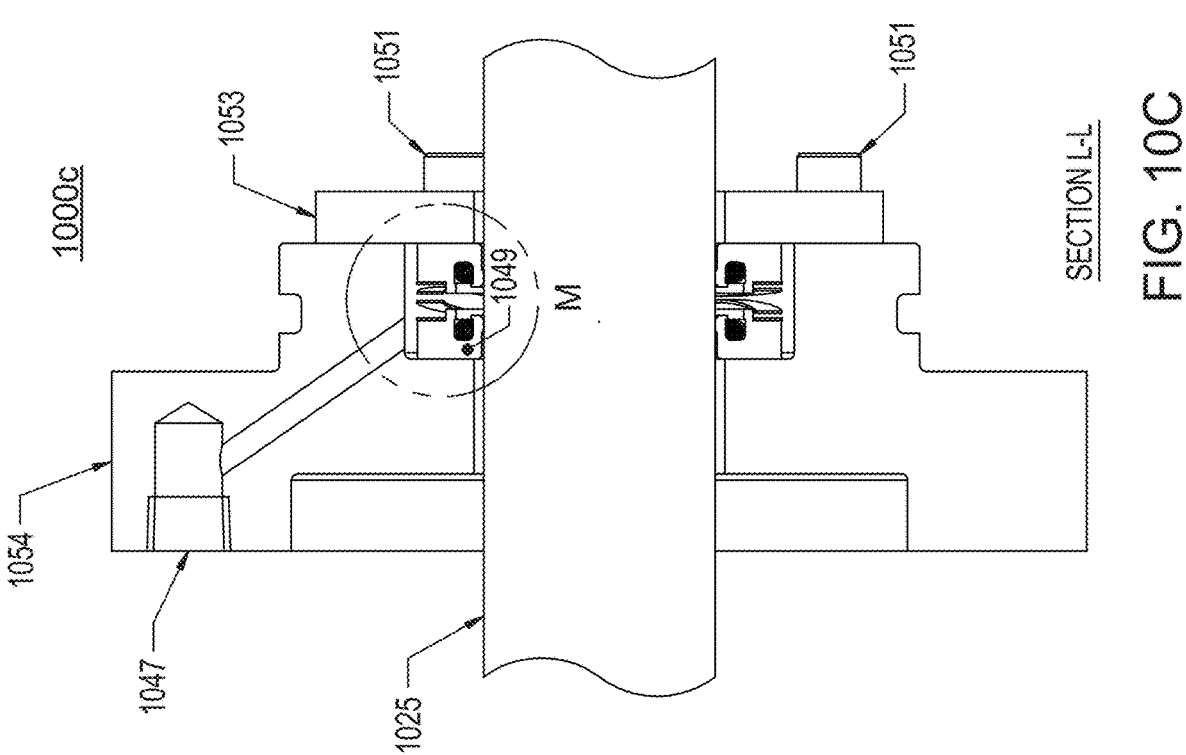
FIG. 10C illustrates a cross section of an intermediate purge seal housing according to various example embodiments.

FIG. 10C illustrates the elements of an example intermediate purge seal housing 1000c. A portion of the piston rod 1025 is shown. Cap screws 1051 secure the plate 1053 to the gland 1054. An embodiment configured as a purge seal 1049 is housed in the gland 1054. A purge connection 1047 on the gland allows for a fitting to be installed to supply purge gas to the purge seal.

FIG. 10D illustrates a detail view of an embodiment configured as a purge seal 1049. The purge gas opening 1048 allows purge gas to flow to the purge seal. Radial clearance between the piston rod outer diameter, and cup inner diameter 1044 may allow for lateral piston rod motion. Radial clearance between the seals outer diameter, and the cup groove inner diameter 1045 may allow for the seals to move with the lateral motion of the piston rod.

FIGS. 11A-11B illustrate an example of a canted coil spring 1100 according to certain example embodiments. In particular, FIG. 11A provides a front view of canted coil spring 1100 showing how the pitch of the coil is canted to the left, while FIG. 11B is a side view of canted coil spring 1100.

The features, structures, or characteristics of example embodiments described throughout this specification may be combined in any suitable manner in one or more example embodiments. For example, the usage of the phrases "various embodiments," "certain embodiments," "some embodiments," or other similar language throughout this specification refers to the fact that a particular feature, structure, or characteristic described in connection with an example embodiment may be included in at least one example embodiment. Thus, appearances of the phrases "in various embodiments," "in certain embodiments," "in some embodiments," or other similar language throughout this specification does not necessarily all refer to the same group of example embodiments, and the described features, structures, or characteristics may be combined in any suitable manner in one or more example embodiments.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

Additionally, if desired, the different functions or procedures discussed above may be performed in a different order and/or concurrently with each other. Furthermore, if desired, one or more of the described functions or procedures may be optional or may be combined. As such, the description above should be considered as illustrative of the principles and teachings of certain example embodiments, and not in limitation thereof.

One having ordinary skill in the art will readily understand that the example embodiments discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of the example embodiments.

I claim:

1. A piston rod lip seal assembly comprising:
   a piston rod;
   a housing component;
   a lip seal comprising a circumferential lip configured to seal an inner diameter of the lip seal, wherein the piston rod lip seal assembly is configured for lateral motion of the piston rod within the housing component, and the lateral motion is perpendicular to an axis of the piston rod;
   a heel;
   a circumferential outer ring; and
   a spring, wherein:
      the spring is disposed between, and in contact with, the circumferential lip and the circumferential outer ring,
      the piston rod lip seal assembly further comprises a wave spring configured for face contact with the housing component, and
      a topology of the sealing face of the housing component has a range of 12 to 20 roughness average (Ra) micro-inches (μ-in), and a range of 0.000002"-0.0000696" flatness,
      a diametrical clearance between an outer diameter of the piston rod and an inner diameter of the housing component is between 4-16% of the outer diameter of the piston rod; and
      a diametrical clearance between an outer diameter of the lip seal and an inner diameter of a groove of the housing component is between 4-16% of the outer diameter of the piston rod.

2. The piston rod lip seal assembly of claim 1, wherein the circumferential outer ring comprises a pilot that houses the wave spring configured to apply an axial preload.

3. The piston rod lip seal assembly of claim 1, wherein the spring comprises a canted coil spring.

4. The piston rod lip seal assembly of claim 1, wherein the piston rod lip seal assembly is configured to at least one of:
   seal oil; or
   transfer oil away from the piston rod.

5. The piston rod lip seal assembly of claim 1, wherein the piston rod lip seal assembly further comprises at least one slot in the heel configured to transfer oil.

6. A piston rod lip seal assembly comprising:
   a piston rod;
   a housing component;
   a lip seal comprising a first circumferential lip configured to seal an inner diameter of the lip seal, and a second circumferential lip configured to seal an outer diameter of the lip seal, wherein the piston rod lip seal assembly is configured for lateral motion of the piston rod within the housing component, and the lateral motion is perpendicular to an axis of the piston rod;

a heel;

a spring; and a seal carrier disposed around, and in contact with, the second circumferential lip of the lip seal, wherein:

the spring is disposed between, in contact with, and secured by the first circumferential lip and the second circumferential lip, the seal carrier is further disposed around, and in contact with, the heel, the seal carrier further comprises a protrusion configured to retain the lip seal axially, the heel comprises a notch disposed at an inner diameter of the lip seal, wherein an anti-extrusion ring is housed in the notch, a topology of the sealing face of the seal carrier has a range of 12 to 20 roughness average (Ra) micro-inches ($\mu$-in), and a range of 0.000002"-0.0000696" flatness, and a topology of the sealing face of the housing component has a range of 12 to 20 roughness average (Ra) micro-inches ($\mu$-in), and a range of 0.000002"-0.0000696" flatness, a diametrical clearance between an outer diameter of the piston rod and an inner diameter of the housing component is between 4-16% of the outer diameter of the piston rod; and a diametrical clearance between an outer diameter of the seal carrier and an inner diameter of a groove of the housing component is between 4-16% of the outer diameter of the piston rod.

7. The piston rod lip seal assembly of claim 6, wherein:

the seal carrier comprises a sealing face; and the housing component comprises a sealing face.

8. The piston rod lip seal assembly of claim 7, wherein the sealing face of the seal carrier is configured to form a seal with the sealing face of the housing component.

9. The piston rod lip seal assembly of claim 6, wherein a diametrical clearance between an inner diameter of the seal carrier and an outer diameter of the piston rod is 0.40%-1.80% of the outer diameter of the piston rod.

10. The piston rod lip seal assembly of claim 6, wherein the seal carrier further comprises at least one protrusion.

11. The piston rod lip seal assembly of claim 10, wherein the protrusion is angled between 20-30 degrees from a face of the seal carrier, and extends 0.005"-0.020" radially inward from a sealing diameter of the seal carrier.

12. The piston rod lip seal assembly of claim 6, wherein the lip seal is pegged to the seal carrier so as to prevent relative rotation.

13. The piston rod lip seal assembly of claim 6, wherein the spring comprises a canted coil spring.

14. A piston rod lip seal assembly comprising:

a piston rod;

a housing component;

a lip seal comprising a first circumferential lip configured to seal an inner diameter of the lip seal, and a second circumferential lip configured to seal an outer diameter of the lip seal, wherein the piston rod lip seal assembly is configured for lateral motion of the piston rod within the housing component, and the lateral motion is perpendicular to an axis of the piston rod;

a heel;

a spring; and a seal carrier disposed around, and in contact with, the second circumferential lip of the lip seal, wherein:

the spring is disposed between, in contact with, and secured by the first circumferential lip and the second circumferential lip, the seal carrier is further disposed around, and in contact with, the heel, the seal carrier further comprises a protrusion configured to retain the lip seal axially, the heel comprises a notch disposed at an inner diameter of the lip seal, wherein an anti-extrusion ring is housed in the notch, a diametrical clearance between an outer diameter of the piston rod and an inner diameter of the housing component is between 4-16% of the outer diameter of the piston rod, a diametrical clearance between an outer diameter of the seal carrier and an inner diameter of a groove of the housing component is between 4-16% of the outer diameter of the piston rod, the seal carrier comprises a sealing face, the housing component comprises a sealing face, a topology of the sealing face of the seal carrier has a range of 12 to 20 roughness average (Ra) micro-inches ($\mu$-in), and a range of 0.000002"-0.0000696" flatness, a topology of the sealing face of the housing component has a range of 12 to 20 roughness average (Ra) micro-inches ($\mu$-in), and a range of 0.000002"-0.0000696" flatness, a diametrical clearance between an inner diameter of the seal carrier and an outer diameter of the piston rod is 0.40%-1.80% of the outer diameter of the piston rod, the seal carrier further comprises at least one protrusion, the protrusion is angled between 20-30 degrees from a face of the seal carrier, and extends 0.005"-0.020" radially inward from a sealing diameter of the seal carrier, and the spring comprises a canted coil spring.

* * * * *